US012812699B2

(12) United States Patent
Gürsu et al.

(10) Patent No.: US 12,812,699 B2
(45) Date of Patent: Nov. 24, 2026

(54) ENHANCED CONTENTION-FREE RANDOM ACCESS (CFRA) PREAMBLE ASSIGNMENT

(71) Applicant: Nokia Technologies Oy, Espoo (FI)

(72) Inventors: Halit Murat Gürsu, Munich (DE); Jedrzej Stanczak, Wroclaw (PL); Ömer Bulakci, Munich (DE); Umur Karabulut, Munich (DE); Ahmad Awada, Munich (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 318 days.

(21) Appl. No.: 18/579,479

(22) PCT Filed: Jul. 19, 2021

(86) PCT No.: PCT/EP2021/070162
§ 371 (c)(1),
(2) Date: Jan. 15, 2024

(87) PCT Pub. No.: WO2023/001364
PCT Pub. Date: Jan. 26, 2023

(65) Prior Publication Data
US 2024/0334497 A1 Oct. 3, 2024

(51) Int. Cl.
*H04W 74/08* (2024.01)
*H04W 36/08* (2009.01)
(Continued)

(52) U.S. Cl.
CPC ....... *H04W 74/0866* (2013.01); *H04W 36/08* (2013.01); *H04W 74/0833* (2013.01); *H04W 36/36* (2013.01); *H04W 74/0838* (2024.01)

(58) Field of Classification Search
None
See application file for complete search history.

(56) References Cited

U.S. PATENT DOCUMENTS 11,012,904 B2 5/2021 Purkayastha et al.
2020/0077314 A1 3/2020 Hwang et al.
(Continued)

FOREIGN PATENT DOCUMENTS

EP 3678316 A1 7/2020
EP 3716682 A1 9/2020
(Continued)

OTHER PUBLICATIONS

English Translation of WO 2019/101186A1 (Year: 2019).*
(Continued)

*Primary Examiner* — Saumit Shah
(74) *Attorney, Agent, or Firm* — BURR & FORMAN LLP

(57) ABSTRACT

There is provided an apparatus comprising means for: receiving, at a user equipment from a first access point supporting a serving cell, one or more user equipment specific allocations of a random access preamble and timing information associated with the random access preamble, the timing information indicating when the user equipment is to use the associated random access preamble; responsive to the receiving, starting a timer; and sending, to a second access point supporting a target cell, a random access request including one of the one or more random access preambles, the included random access preamble being selected based on a value of the timer and the timing information.

17 Claims, 13 Drawing Sheets

(51) Int. Cl.

| | |
|---|---|
| ***H04W 74/0833*** | (2024.01) |
| *H04W 36/36* | (2009.01) |
| *H04W 74/0838* | (2024.01) |

(56) References Cited

U.S. PATENT DOCUMENTS

| | | | | |
|---|---|---|---|---|
| 2020/0154326 | A1 | 5/2020 | Deenoo et al. | |
| 2021/0377830 | A1* | 12/2021 | Jin | H04W 36/0058 |
| 2021/0410034 | A1* | 12/2021 | You | H04W 36/362 |
| 2022/0191752 | A1* | 6/2022 | Rune | H04W 36/0058 |
| 2022/0201561 | A1* | 6/2022 | Bin Redhwan | H04W 36/0072 |
| 2022/0264636 | A1* | 8/2022 | Wang | H04B 7/18513 |
| 2023/0284264 | A1* | 9/2023 | Kim | H04W 80/02<br>370/329 |

FOREIGN PATENT DOCUMENTS

| | | | | |
|---|---|---|---|---|
| WO | WO-2019101186 | A1 * | 5/2019 | H04W 56/00 |
| WO | 2020/036524 | A1 | 2/2020 | |

OTHER PUBLICATIONS

"3rd Generation Partnership Project, Technical Specification Group Radio Access Network; NR; NR and NG-RAN Overall Description; Stage 2 (Release 16)", 3GPP TS 38.300, V16.5.0, Mar. 2021, pp. 1-151.

"3rd Generation Partnership Project; Technical Specification Group Radio Access Network; NR; Physical layer procedures for control (Release 16)", 3GPP TS 38.213, V16.5.0, Mar. 2021, pp. 1-183.

"Msc-generator", Sourceforge, Retrieved on Jan. 3, 2024, Webpage available at : https://sourceforge.net/projects/msc-generator/.

Martikainen et al., "On the basics of conditional handover for 5G mobility", IEEE 29th Annual International Symposium on Personal, Indoor and Mobile Radio Communications (PIMRC), Sep. 9-12, 2018, 7 pages.

"3rd Generation Partnership Project; Technical Specification Group Radio Access Network; NG-RAN; Xn application protocol (XnAP) (Release 16)", 3GPP TS 38.423, V16.5.0, Apr. 2021, pp. 1-461.

International Search Report and Written Opinion received for corresponding Patent Cooperation Treaty Application No. PCT/EP2021/070162, dated Apr. 12, 2022, 19 pages.

* cited by examiner

ENHANCED CONTENTION-FREE RANDOM ACCESS (CFRA) PREAMBLE ASSIGNMENT

RELATED APPLICATION

This application claims priority to PCT Application No. PCT/EP2021/070162, filed on Jul. 19, 2021, which is incorporated herein by reference in its entirety.

FIELD

The present application relates to a method, apparatus, and computer program and in particular but not exclusively to performing random access based on timing information.

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communication sessions may comprise, for example, communication of data for carrying communications such as voice, video, electronic mail (email), text message, multimedia and/or content data and so on. Non-limiting examples of services provided comprise two-way or multi-way calls, data communication or multimedia services and access to a data network system, such as the Internet.

In a wireless communication system at least a part of a communication session between at least two stations occurs over a wireless link. Examples of wireless systems comprise public land mobile networks (PLMN), satellite based communication systems and different wireless local networks, for example wireless local area networks (WLAN). Some wireless systems can be divided into cells, and are therefore often referred to as cellular systems.

A user can access the communication system by means of an appropriate communication device or terminal. A communication device of a user may be referred to as user equipment (UE) or user device. A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). Other examples of communication systems are the long-term evolution (LTE) of the Universal Mobile Telecommunications System (UMTS) radio-access technology and so-called 5G or New Radio (NR) networks. NR is being standardized by the 3rd Generation Partnership Project (3GPP).

SUMMARY

According to an aspect, there is provided an apparatus for a user equipment, the apparatus comprising means for:

receiving, at a user equipment from a first access point supporting a serving cell, one or more user equipment specific allocations of a random access preamble and timing information associated with the random access preamble, the timing information indicating when the user equipment is to use the associated random access preamble; responsive to the receiving, starting a timer; and sending, to a second access point supporting a target cell, a random access request including one of the one or more random access preambles, the included random access preamble being selected based on a value of the timer and the timing information.

The means may be for: sending, to the first access point supporting the serving cell, a measurement report.

The means may be for receiving, from the first access point, at least one of: a handover command to cause the user equipment to initiate handover from the serving cell to the target cell; and information identifying one or more conditions, wherein the user equipment is configured to perform handover from the serving cell to the target cell when the one or more conditions are met.

The means may be for: determining that the one or more conditions have been met, and wherein sending the random access request is performed responsive to the determining; and selecting which of the one or more random access preambles to use based on the value of the timer and the timing information.

The means may be for: logging a value of the timer when sending the random access request including the one of the one or more random access preambles.

The means may be for: determining that a value of the timer reaches a certain value; determining that no random access response has been received from the target cell before the value of the timer has reached the certain value; and performing a contention based random access procedure to access the target cell responsive to determining that no random access response has been received from the target cell before the value of the timer has reached the certain value.

According to an aspect, there is provided an apparatus comprising means for: receiving, at a first access point supporting a serving cell from a second access point supporting a target cell, one or more user equipment specific allocations of a random access preamble and timing information associated with the random access preamble, the timing information indicating when the associated random access preamble is to be used; and sending, from the first access point to the user equipment, the one or more user equipment specific allocations of a random access preamble and timing information associated with the random access preamble.

The means may be for: receiving, from the user equipment, a measurement report; determining that a handover of the user equipment is necessary based on the measurement report; and sending, to the second access point, a handover preparation request for the user equipment to the target cell, wherein the target cell is selected based on the measurement report.

The means may be for: receiving, from the second access point, a handover acknowledgement, wherein the handover acknowledgement includes the one or more user equipment specific allocations of a random access preamble and timing information associated with the random access preamble, wherein sending to the user equipment one or more user equipment specific allocations of a random access preamble and timing information associated with the random access preamble comprises sending a radio resource control reconfiguration message including the one or more user equipment specific allocations of a random access preamble and timing information associated with the random access preamble.

The sending may comprise at least one of: sending a handover command to cause the user equipment to initiate handover from the serving cell to the target cell, wherein the handover command includes the one or more user equipment specific allocations of a random access preamble and timing information associated with the random access preamble; and sending the one or more user equipment specific allocations of a random access preamble and timing information associated with the random access preamble, and information identifying one or more conditions, wherein the user equipment is configured to perform handover from the serving cell to the target cell when the one or more conditions are met.

The means may be for: sending the one or more user equipment specific allocations of a random access preamble and timing information associated with the random access preamble to a plurality of user equipments, wherein the timing information provided to each of the plurality of user equipments is one of: non-overlapping or overlapping.

According to an aspect, there is provided an apparatus comprising means for: obtaining, at a second access point supporting a target cell from a radio access node data collection entity, one or more user equipment specific allocations of a random access preamble and timing information associated with the random access preamble, the timing information indicating when the associated random access preamble is to be used; sending, from the second access point to a first access point supporting a serving cell, the one or more user equipment specific allocations of the random access preamble and timing information associated with the random access preamble; and receiving, at the second access point from the user equipment, a random access request including a random access preamble corresponding to one of the user equipment specific allocations of the random access preamble.

The means may be for: receiving, at the second access point from the first access point, a handover preparation request for the user equipment, wherein the obtaining is performed response to receiving the handover preparation request.

The obtaining may comprise: sending, to the radio access node data collection entity, a request for the one or more user equipment specific allocations of a random access preamble and timing information associated with the random access preamble; and receiving, from the radio access node data collection entity, the one or more user equipment specific allocations of a random access preamble and timing information associated with the random access preamble.

The request may comprise at least one of: an identifier of the serving cell of the user equipment; information associated with any active user equipment beams; user equipment capability information; user equipment mobility state information; an estimated arrival probability of the user equipment at the target cell; a list of candidate beams for the user equipment at the target cell; and a current load status of beams and random access channel at the target cell.

The obtaining may comprise: receiving, from the radio access node data collection entity, a list comprising a plurality of user equipment specific allocations of a random access preamble and timing information associated with the random access preamble; and selecting, by the second access point, one of the plurality of user equipment specific allocations of a random access preamble and timing information associated with the random access preamble.

The means may be for: sending, to the radio access node data collection entity, information identifying the selected one of the user equipment specific allocations of a random access preamble and timing information associated with the random access preamble.

The means may be for: responsive to receiving the random access request, sending, to the radio access node data collection entity, information identifying the random access preamble included in the random access request and timing information identifying when the random access request was received by the second access point.

The means may be for: responsive to receiving the random access request, sending, to the first access point, a handover acknowledgement, wherein the handover acknowledgement includes the random access preamble included in the random access request.

According to an aspect, there is provided an apparatus comprising means for: determining, at a radio access node data collection entity, one or more user equipment specific allocations of a random access preamble and timing information associated with the random access preamble, the timing information indicating when the associated random access preamble is to be used; and sending, from the radio access node data collection entity to a second access point supporting a target cell, the one or more user equipment specific allocations of a random access preamble and timing information associated with the random access preamble.

The means may be for: receiving, from the second access point, a request for the one or more user equipment specific allocations of a random access preamble and timing information associated with the random access preamble, wherein the sending is performed responsive to the receiving.

The one or more user equipment specific allocations of a random access preamble and timing information associated with the random access preamble may comprise a list comprising a plurality of random access preambles and timing information associated with the plurality of random access preambles.

The means may be for: receiving, from the second access point, information identifying a selected random access preamble and timing information associated with the selected random access preamble.

The determining may be based on at least one of: information received from the second access point; information about the random access history of the user equipment; and information about the history of the user equipment slice and/or class and/or type.

The information received from the second access point may comprise at least one of: an identifier of the serving cell of the user equipment; information associated with any active user equipment beams; user equipment capability information; user equipment mobility state information; an estimated arrival probability of the user equipment at the target cell; a list of candidate beams for the user equipment at the target cell; and a current load status of beams and random access channel at the target cell.

The means may be for: receiving from at least a third access point supporting a further target cell, information indicating that at least one of the one or more random access preambles and timing information associated with the one of the one or more random access preambles selected by the second access point has also been selected by the third access point; determining, based on the timing information associated with the at least one of the one or more random access preambles selected by the second access point and the third access point, that an error when performing random access using the at least one of the one or more random access preambles is likely; and sending, to at least one of the second access point and the third access point, information for causing at least one of the second access point and the third access point to select a different random access preamble and/or timing.

The means may be for: receiving, from the second access point, information identifying that one of the one or more random access preambles has been included in the random access request, and timing information identifying when the random access request was received by the second access point.

According to an aspect, there is provided an apparatus comprising at least one processor and at least one memory including a computer program code, the at least one memory and computer program code configured to, with the at least one processor, cause the apparatus at least to: receive, at a user equipment from a first access point supporting a serving cell, one or more user equipment specific allocations of a random access preamble and timing information associated with the random access preamble, the timing information indicating when the user equipment is to use the associated random access preamble; responsive to the receiving, start a timer; and send, to a second access point supporting a target cell, a random access request including one of the one or more random access preambles, the included random access preamble being selected based on a value of the timer and the timing information.

The at least one memory and at least one processor may be configured to cause the apparatus to send, to the first access point supporting the serving cell, a measurement report.

The at least one memory and at least one processor may be configured to cause the apparatus to: receive, from the first access point, at least one of: a handover command to cause the user equipment to initiate handover from the serving cell to the target cell; and information identifying one or more conditions, wherein the user equipment is configured to perform handover from the serving cell to the target cell when the one or more conditions are met.

The at least one memory and at least one processor may be configured to cause the apparatus to: determine that the one or more conditions have been met, and wherein the apparatus is configured to send the random access request is performed responsive to the determining; and select which of the one or more random access preambles to use based on the value of the timer and the timing information.

The at least one memory and at least one processor may be configured to cause the apparatus to: log a value of the timer when sending the random access request including the one of the one or more random access preambles.

The at least one memory and at least one processor may be configured to cause the apparatus to: determine that a value of the timer reaches a certain value; determine that no random access response has been received from the target cell before the value of the timer has reached the certain value; and perform a contention based random access procedure to access the target cell responsive to determining that no random access response has been received from the target cell before the value of the timer has reached the certain value.

According to an aspect, there is provided an apparatus comprising at least one processor and at least one memory including a computer program code, the at least one memory and computer program code configured to, with the at least one processor, cause the apparatus at least to: receive, at a first access point supporting a serving cell from a second access point supporting a target cell, one or more user equipment specific allocations of a random access preamble and timing information associated with the random access preamble, the timing information indicating when the associated random access preamble is to be used; and send, from the first access point to the user equipment, the one or more user equipment specific allocations of a random access preamble and timing information associated with the random access preamble.

The at least one memory and at least one processor may be configured to cause the apparatus to: receive, from the user equipment, a measurement report; determine that a handover of the user equipment is necessary based on the measurement report; and send, to the second access point, a handover preparation request for the user equipment to the target cell, wherein the target cell is selected based on the measurement report.

The at least one memory and at least one processor may be configured to cause the apparatus to: receive, from the second access point, a handover acknowledgement, wherein the handover acknowledgement includes the one or more user equipment specific allocations of a random access preamble and timing information associated with the random access preamble, and wherein the apparatus is caused to send to the user equipment one or more user equipment specific allocations of a random access preamble and timing information associated with the random access preamble by sending a radio resource control reconfiguration message including the one or more user equipment specific allocations of a random access preamble and timing information associated with the random access preamble.

The sending may comprise at least one of: sending a handover command to cause the user equipment to initiate handover from the serving cell to the target cell, wherein the handover command includes the one or more user equipment specific allocations of a random access preamble and timing information associated with the random access preamble; and sending the one or more user equipment specific allocations of a random access preamble and timing information associated with the random access preamble, and information identifying one or more conditions, wherein the user equipment is configured to perform handover from the serving cell to the target cell when the one or more conditions are met.

The at least one memory and at least one processor may be configured to cause the apparatus to: send the one or more user equipment specific allocations of a random access preamble and timing information associated with the random access preamble to a plurality of user equipments, wherein the timing information provided to each of the plurality of user equipments is one of: non-overlapping or overlapping.

According to an aspect, there is provided an apparatus comprising at least one processor and at least one memory including a computer program code, the at least one memory and computer program code configured to, with the at least one processor, cause the apparatus at least to: obtain, at a second access point supporting a target cell from a radio access node data collection entity, one or more user equipment specific allocations of a random access preamble and timing information associated with the random access preamble, the timing information indicating when the associated random access preamble is to be used; send, from the second access point to a first access point supporting a serving cell, the one or more user equipment specific allocations of the random access preamble and timing information associated with the random access preamble; and receive, at the second access point from the user equipment, a random access request including a random access preamble corresponding to one of the user equipment specific allocations of the random access preamble.

The at least one memory and at least one processor may be configured to cause the apparatus to: receive, at the second access point from the first access point, a handover preparation request for the user equipment, wherein the apparatus is caused to perform the obtaining in response to receiving the handover preparation request.

The obtaining may comprise: sending, to the radio access node data collection entity, a request for the one or more user equipment specific allocations of a random access preamble and timing information associated with the random access preamble; and receiving, from the radio access node data collection entity, the one or more user equipment specific allocations of a random access preamble and timing information associated with the random access preamble.

The request may comprise at least one of: an identifier of the serving cell of the user equipment; information associated with any active user equipment beams; user equipment capability information; user equipment mobility state information; an estimated arrival probability of the user equipment at the target cell; a list of candidate beams for the user equipment at the target cell; and a current load status of beams and random access channel at the target cell.

The obtaining may comprise: receiving, from the radio access node data collection entity, a list comprising a plurality of user equipment specific allocations of a random access preamble and timing information associated with the random access preamble; and selecting, by the second access point, one of the plurality of user equipment specific allocations of a random access preamble and timing information associated with the random access preamble.

The at least one memory and at least one processor may be configured to cause the apparatus to: send, to the radio access node data collection entity, information identifying the selected one of the user equipment specific allocations of a random access preamble and timing information associated with the random access preamble.

The at least one memory and at least one processor may be configured to cause the apparatus to: responsive to receiving the random access request, send, to the radio access node data collection entity, information identifying the random access preamble included in the random access request and timing information identifying when the random access request was received by the second access point.

The at least one memory and at least one processor may be configured to cause the apparatus to: responsive to receiving the random access request, send, to the first access point, a handover acknowledgement, wherein the handover acknowledgement includes the random access preamble included in the random access request.

According to an aspect, there is provided an apparatus comprising at least one processor and at least one memory including a computer program code, the at least one memory and computer program code configured to, with the at least one processor, cause the apparatus at least to: determine, at a radio access node data collection entity, one or more user equipment specific allocations of a random access preamble and timing information associated with the random access preamble, the timing information indicating when the associated random access preamble is to be used; and send, from the radio access node data collection entity to a second access point supporting a target cell, the one or more user equipment specific allocations of a random access preamble and timing information associated with the random access preamble.

The at least one memory and at least one processor may be configured to cause the apparatus to: receive, from the second access point, a request for the one or more user equipment specific allocations of a random access preamble and timing information associated with the random access preamble, wherein the apparatus is caused to perform the sending responsive to the receiving.

The one or more user equipment specific allocations of a random access preamble and timing information associated with the random access preamble may comprise a list comprising a plurality of random access preambles and timing information associated with the plurality of random access preambles.

The at least one memory and at least one processor may be configured to cause the apparatus to: receive, from the second access point, information identifying a selected random access preamble and timing information associated with the selected random access preamble.

The at least one memory and at least one processor may be configured to cause the apparatus to perform the determining based on at least one of: information received from the second access point; information about the random access history of the user equipment; and information about the history of the user equipment slice and/or class and/or type.

The information received from the second access point may comprise at least one of: an identifier of the serving cell of the user equipment; information associated with any active user equipment beams; user equipment capability information; user equipment mobility state information; an estimated arrival probability of the user equipment at the target cell; a list of candidate beams for the user equipment at the target cell; and a current load status of beams and random access channel at the target cell.

The at least one memory and at least one processor may be configured to cause the apparatus to: receive from at least a third access point supporting a further target cell, information indicating that at least one of the one or more random access preambles and timing information associated with the one of the one or more random access preambles selected by the second access point has also been selected by the third access point; determine, based on the timing information associated with the at least one of the one or more random access preambles selected by the second access point and the third access point, that an error when performing random access using the at least one of the one or more random access preambles is likely; and send, to at least one of the second access point and the third access point, information for causing at least one of the second access point and the third access point to select a different random access preamble and/or timing.

The at least one memory and at least one processor may be configured to cause the apparatus to: receive, from the second access point, information identifying that one of the one or more random access preambles has been included in the random access request, and timing information identifying when the random access request was received by the second access point.

According to an aspect, there is provided a method comprising: receiving, at a user equipment from a first access point supporting a serving cell, one or more user equipment specific allocations of a random access preamble and timing information associated with the random access preamble, the timing information indicating when the user equipment is to use the associated random access preamble; responsive to the receiving, starting a timer; and sending, to a second access point supporting a target cell, a random access request including one of the one or more random access preambles, the included random access preamble being selected based on a value of the timer and the timing information.

The method may comprise: sending, to the first access point supporting the serving cell, a measurement report.

The method may comprise: receiving, from the first access point, at least one of: a handover command to cause the user equipment to initiate handover from the serving cell to the target cell; and information identifying one or more conditions, wherein the user equipment is configured to perform handover from the serving cell to the target cell when the one or more conditions are met.

The method may comprise: determining that the one or more conditions have been met, and wherein sending the random access request is performed responsive to the determining; and selecting which of the one or more random access preambles to use based on the value of the timer and the timing information.

The method may comprise: logging a value of the timer when sending the random access request including the one of the one or more random access preambles.

The method may comprise: determining that a value of the timer reaches a certain value; determining that no random access response has been received from the target cell before the value of the timer has reached the certain value; and performing a contention based random access procedure to access the target cell responsive to determining that no random access response has been received from the target cell before the value of the timer has reached the certain value.

According to an aspect, there is provided a method comprising: receiving, at a first access point supporting a serving cell from a second access point supporting a target cell, one or more user equipment specific allocations of a random access preamble and timing information associated with the random access preamble, the timing information indicating when the associated random access preamble is to be used; and sending, from the first access point to the user equipment, the one or more user equipment specific allocations of a random access preamble and timing information associated with the random access preamble.

The method may comprise: receiving, from the user equipment, a measurement report; determining that a handover of the user equipment is necessary based on the measurement report; and sending, to the second access point, a handover preparation request for the user equipment to the target cell, wherein the target cell is selected based on the measurement report.

The method may comprise: receiving, from the second access point, a handover acknowledgement, wherein the handover acknowledgement includes the one or more user equipment specific allocations of a random access preamble and timing information associated with the random access preamble, wherein sending to the user equipment one or more user equipment specific allocations of a random access preamble and timing information associated with the random access preamble comprises sending a radio resource control reconfiguration message including the one or more user equipment specific allocations of a random access preamble and timing information associated with the random access preamble.

The sending may comprise at least one of: sending a handover command to cause the user equipment to initiate handover from the serving cell to the target cell, wherein the handover command includes the one or more user equipment specific allocations of a random access preamble and timing information associated with the random access preamble; and sending the one or more user equipment specific allocations of a random access preamble and timing information associated with the random access preamble, and information identifying one or more conditions, wherein the user equipment is configured to perform handover from the serving cell to the target cell when the one or more conditions are met.

The method may comprise: sending the one or more user equipment specific allocations of a random access preamble and timing information associated with the random access preamble to a plurality of user equipments, wherein the timing information provided to each of the plurality of user equipments is one of: non-overlapping or overlapping.

According to an aspect, there is provided a method comprising: obtaining, at a second access point supporting a target cell from a radio access node data collection entity, one or more user equipment specific allocations of a random access preamble and timing information associated with the random access preamble, the timing information indicating when the associated random access preamble is to be used; sending, from the second access point to a first access point supporting a serving cell, the one or more user equipment specific allocations of the random access preamble and timing information associated with the random access preamble; and receiving, at the second access point from the user equipment, a random access request including a random access preamble corresponding to one of the user equipment specific allocations of the random access preamble.

The method may comprise: receiving, at the second access point from the first access point, a handover preparation request for the user equipment, wherein the obtaining is performed response to receiving the handover preparation request.

The obtaining may comprise: sending, to the radio access node data collection entity, a request for the one or more user equipment specific allocations of a random access preamble and timing information associated with the random access preamble; and receiving, from the radio access node data collection entity, the one or more user equipment specific allocations of a random access preamble and timing information associated with the random access preamble.

The request may comprise at least one of: an identifier of the serving cell of the user equipment; information associated with any active user equipment beams; user equipment capability information; user equipment mobility state information; an estimated arrival probability of the user equipment at the target cell; a list of candidate beams for the user equipment at the target cell; and a current load status of beams and random access channel at the target cell.

The obtaining may comprise: receiving, from the radio access node data collection entity, a list comprising a plurality of user equipment specific allocations of a random access preamble and timing information associated with the random access preamble; and selecting, by the second access point, one of the plurality of user equipment specific allocations of a random access preamble and timing information associated with the random access preamble.

The method may comprise: sending, to the radio access node data collection entity, information identifying the selected one of the user equipment specific allocations of a random access preamble and timing information associated with the random access preamble.

The method may comprise: responsive to receiving the random access request, sending, to the radio access node data collection entity, information identifying the random access preamble included in the random access request and timing information identifying when the random access request was received by the second access point.

The method may comprise: responsive to receiving the random access request, sending, to the first access point, a handover acknowledgement, wherein the handover acknowledgement includes the random access preamble included in the random access request.

According to an aspect, there is provided a method comprising: determining, at a radio access node data collection entity, one or more user equipment specific allocations of a random access preamble and timing information associated with the random access preamble, the timing information indicating when the associated random access preamble is to be used; and sending, from the radio access node data collection entity to a second access point supporting a target cell, the one or more user equipment specific allocations of a random access preamble and timing information associated with the random access preamble.

The method may comprise: receiving, from the second access point, a request for the one or more user equipment specific allocations of a random access preamble and timing information associated with the random access preamble, wherein the sending is performed responsive to the receiving.

The one or more user equipment specific allocations of a random access preamble and timing information associated with the random access preamble may comprise a list comprising a plurality of random access preambles and timing information associated with the plurality of random access preambles.

The method may comprise: receiving, from the second access point, information identifying a selected random access preamble and timing information associated with the selected random access preamble.

The determining may be based on at least one of: information received from the second access point; information about the random access history of the user equipment; and information about the history of the user equipment slice and/or class and/or type.

The information received from the second access point may comprise at least one of: an identifier of the serving cell of the user equipment; information associated with any active user equipment beams; user equipment capability information; user equipment mobility state information; an estimated arrival probability of the user equipment at the target cell; a list of candidate beams for the user equipment at the target cell; and a current load status of beams and random access channel at the target cell.

The method may comprise: receiving from at least a third access point supporting a further target cell, information indicating that at least one of the one or more random access preambles and timing information associated with the one of the one or more random access preambles selected by the second access point has also been selected by the third access point; determining, based on the timing information associated with the at least one of the one or more random access preambles selected by the second access point and the third access point, that an error when performing random access using the at least one of the one or more random access preambles is likely; and sending, to at least one of the second access point and the third access point, information for causing at least one of the second access point and the third access point to select a different random access preamble and/or timing.

The method may comprise: receiving, from the second access point, information identifying that one of the one or more random access preambles has been included in the random access request, and timing information identifying when the random access request was received by the second access point.

According to an aspect, there is provided a computer readable medium comprising program instructions for causing an apparatus to perform at least the following: receiving, at a user equipment from a first access point supporting a serving cell, one or more user equipment specific allocations of a random access preamble and timing information associated with the random access preamble, the timing information indicating when the user equipment is to use the associated random access preamble; responsive to the receiving, starting a timer; and sending, to a second access point supporting a target cell, a random access request including one of the one or more random access preambles, the included random access preamble being selected based on a value of the timer and the timing information.

The apparatus may be caused to perform: sending, to the first access point supporting the serving cell, a measurement report.

The apparatus may be caused to perform: receiving, from the first access point, at least one of: a handover command to cause the user equipment to initiate handover from the serving cell to the target cell; and information identifying one or more conditions, wherein the user equipment is configured to perform handover from the serving cell to the target cell when the one or more conditions are met.

The apparatus may be caused to perform: determining that the one or more conditions have been met, and wherein sending the random access request is performed responsive to the determining; and selecting which of the one or more random access preambles to use based on the value of the timer and the timing information.

The apparatus may be caused to perform: logging a value of the timer when sending the random access request including the one of the one or more random access preambles.

The apparatus may be caused to perform: determining that a value of the timer reaches a certain value; determining that no random access response has been received from the target cell before the value of the timer has reached the certain value; and performing a contention based random access procedure to access the target cell responsive to determining that no random access response has been received from the target cell before the value of the timer has reached the certain value.

According to an aspect, there is provided a computer readable medium comprising program instructions for causing an apparatus to perform at least the following: receiving, at a first access point supporting a serving cell from a second access point supporting a target cell, one or more user equipment specific allocations of a random access preamble and timing information associated with the random access preamble, the timing information indicating when the associated random access preamble is to be used; and sending, from the first access point to the user equipment, the one or more user equipment specific allocations of a random access preamble and timing information associated with the random access preamble.

The apparatus may be caused to perform: receiving, from the user equipment, a measurement report; determining that a handover of the user equipment is necessary based on the measurement report; and sending, to the second access point, a handover preparation request for the user equipment to the target cell, wherein the target cell is selected based on the measurement report.

The apparatus may be caused to perform: receiving, from the second access point, a handover acknowledgement, wherein the handover acknowledgement includes the one or more user equipment specific allocations of a random access preamble and timing information associated with the random access preamble, wherein sending to the user equipment one or more user equipment specific allocations of a random access preamble and timing information associated with the random access preamble comprises sending a radio resource control reconfiguration message including the one or more user equipment specific allocations of a random access preamble and timing information associated with the random access preamble.

The sending may comprise at least one of: sending a handover command to cause the user equipment to initiate handover from the serving cell to the target cell, wherein the handover command includes the one or more user equipment specific allocations of a random access preamble and timing information associated with the random access preamble; and sending the one or more user equipment specific allocations of a random access preamble and timing information associated with the random access preamble, and information identifying one or more conditions, wherein the user equipment is configured to perform handover from the serving cell to the target cell when the one or more conditions are met.

The apparatus may be caused to perform: sending the one or more user equipment specific allocations of a random access preamble and timing information associated with the random access preamble to a plurality of user equipments, wherein the timing information provided to each of the plurality of user equipments is one of: non-overlapping or overlapping.

According to an aspect, there is provided a computer readable medium comprising program instructions for causing an apparatus to perform at least the following: obtaining, at a second access point supporting a target cell from a radio access node data collection entity, one or more user equipment specific allocations of a random access preamble and timing information associated with the random access preamble, the timing information indicating when the associated random access preamble is to be used; sending, from the second access point to a first access point supporting a serving cell, the one or more user equipment specific allocations of the random access preamble and timing information associated with the random access preamble; and receiving, at the second access point from the user equipment, a random access request including a random access preamble corresponding to one of the user equipment specific allocations of the random access preamble.

The apparatus may be caused to perform: receiving, at the second access point from the first access point, a handover preparation request for the user equipment, wherein the obtaining is performed response to receiving the handover preparation request.

The obtaining may comprise: sending, to the radio access node data collection entity, a request for the one or more user equipment specific allocations of a random access preamble and timing information associated with the random access preamble; and receiving, from the radio access node data collection entity, the one or more user equipment specific allocations of a random access preamble and timing information associated with the random access preamble.

The request may comprise at least one of: an identifier of the serving cell of the user equipment; information associated with any active user equipment beams; user equipment capability information; user equipment mobility state information; an estimated arrival probability of the user equipment at the target cell; a list of candidate beams for the user equipment at the target cell; and a current load status of beams and random access channel at the target cell.

The obtaining may comprise: receiving, from the radio access node data collection entity, a list comprising a plurality of user equipment specific allocations of a random access preamble and timing information associated with the random access preamble; and selecting, by the second access point, one of the plurality of user equipment specific allocations of a random access preamble and timing information associated with the random access preamble.

The apparatus may be caused to perform: sending, to the radio access node data collection entity, information identifying the selected one of the user equipment specific allocations of a random access preamble and timing information associated with the random access preamble.

The apparatus may be caused to perform: responsive to receiving the random access request, sending, to the radio access node data collection entity, information identifying the random access preamble included in the random access request and timing information identifying when the random access request was received by the second access point.

The apparatus may be caused to perform: responsive to receiving the random access request, sending, to the first access point, a handover acknowledgement, wherein the handover acknowledgement includes the random access preamble included in the random access request.

According to an aspect, there is provided a computer readable medium comprising program instructions for causing an apparatus to perform at least the following: determining, at a radio access node data collection entity, one or more user equipment specific allocations of a random access preamble and timing information associated with the random access preamble, the timing information indicating when the associated random access preamble is to be used; and sending, from the radio access node data collection entity to a second access point supporting a target cell, the one or more user equipment specific allocations of a random access preamble and timing information associated with the random access preamble.

The apparatus may be caused to perform: receiving, from the second access point, a request for the one or more user equipment specific allocations of a random access preamble and timing information associated with the random access preamble, wherein the sending is performed responsive to the receiving.

The one or more user equipment specific allocations of a random access preamble and timing information associated with the random access preamble may comprise a list comprising a plurality of random access preambles and timing information associated with the plurality of random access preambles.

The apparatus may be caused to perform: receiving, from the second access point, information identifying a selected random access preamble and timing information associated with the selected random access preamble.

The determining may be based on at least one of: information received from the second access point; information about the random access history of the user equipment; and information about the history of the user equipment slice and/or class and/or type.

The information received from the second access point may comprise at least one of: an identifier of the serving cell of the user equipment; information associated with any active user equipment beams; user equipment capability information; user equipment mobility state information; an estimated arrival probability of the user equipment at the target cell; a list of candidate beams for the user equipment at the target cell; and a current load status of beams and random access channel at the target cell.

The apparatus may be caused to perform: receiving from at least a third access point supporting a further target cell, information indicating that at least one of the one or more random access preambles and timing information associated with the one of the one or more random access preambles selected by the second access point has also been selected by the third access point; determining, based on the timing information associated with the at least one of the one or more random access preambles selected by the second access point and the third access point, that an error when performing random access using the at least one of the one or more random access preambles is likely; and sending, to at least one of the second access point and the third access point, information for causing at least one of the second access point and the third access point to select a different random access preamble and/or timing.

The apparatus may be caused to perform: receiving, from the second access point, information identifying that one of the one or more random access preambles has been included in the random access request, and timing information identifying when the random access request was received by the second access point.

According to an aspect, there is provided a non-transitory computer readable medium comprising program instructions for causing an apparatus to perform at least the method according to any of the preceding aspects.

According to an aspect, there is provided circuitry for: receiving, at a user equipment from a first access point supporting a serving cell, one or more user equipment specific allocations of a random access preamble and timing information associated with the random access preamble, the timing information indicating when the user equipment is to use the associated random access preamble; responsive to the receiving, starting a timer; and sending, to a second access point supporting a target cell, a random access request including one of the one or more random access preambles, the included random access preamble being selected based on a value of the timer and the timing information.

The circuitry may be for: sending, to the first access point supporting the serving cell, a measurement report.

The circuitry may be for: receiving, from the first access point, at least one of: a handover command to cause the user equipment to initiate handover from the serving cell to the target cell; and information identifying one or more conditions, wherein the user equipment is configured to perform handover from the serving cell to the target cell when the one or more conditions are met.

The circuitry may be for: determining that the one or more conditions have been met, and wherein sending the random access request is performed responsive to the determining; and selecting which of the one or more random access preambles to use based on the value of the timer and the timing information.

The circuitry may be for: logging a value of the timer when sending the random access request including the one of the one or more random access preambles.

The circuitry may be for: determining that a value of the timer reaches a certain value; determining that no random access response has been received from the target cell before the value of the timer has reached the certain value; and performing a contention based random access procedure to access the target cell responsive to determining that no random access response has been received from the target cell before the value of the timer has reached the certain value.

According to an aspect, there is provided circuitry for: receiving, at a first access point supporting a serving cell from a second access point supporting a target cell, one or more user equipment specific allocations of a random access preamble and timing information associated with the random access preamble, the timing information indicating when the associated random access preamble is to be used; and sending, from the first access point to the user equipment, the one or more user equipment specific allocations of a random access preamble and timing information associated with the random access preamble.

The circuitry may be for: receiving, from the user equipment, a measurement report; determining that a handover of the user equipment is necessary based on the measurement report; and sending, to the second access point, a handover preparation request for the user equipment to the target cell, wherein the target cell is selected based on the measurement report.

The circuitry may be for: receiving, from the second access point, a handover acknowledgement, wherein the handover acknowledgement includes the one or more user equipment specific allocations of a random access preamble and timing information associated with the random access preamble, wherein sending to the user equipment one or more user equipment specific allocations of a random access preamble and timing information associated with the random access preamble comprises sending a radio resource control reconfiguration message including the one or more user equipment specific allocations of a random access preamble and timing information associated with the random access preamble.

The sending may comprise at least one of: sending a handover command to cause the user equipment to initiate handover from the serving cell to the target cell, wherein the handover command includes the one or more user equipment specific allocations of a random access preamble and timing information associated with the random access preamble; and sending the one or more user equipment specific allocations of a random access preamble and timing information associated with the random access preamble, and information identifying one or more conditions, wherein the user equipment is configured to perform handover from the serving cell to the target cell when the one or more conditions are met.

The circuitry may be for: sending the one or more user equipment specific allocations of a random access preamble and timing information associated with the random access preamble to a plurality of user equipments, wherein the timing information provided to each of the plurality of user equipments is one of: non-overlapping or overlapping.

According to an aspect, there is provided circuitry for: obtaining, at a second access point supporting a target cell from a radio access node data collection entity, one or more user equipment specific allocations of a random access preamble and timing information associated with the random access preamble, the timing information indicating when the associated random access preamble is to be used; sending, from the second access point to a first access point supporting a serving cell, the one or more user equipment specific allocations of the random access preamble and timing information associated with the random access preamble; and receiving, at the second access point from the user equipment, a random access request including a random access preamble corresponding to one of the user equipment specific allocations of the random access preamble.

The circuitry may be for: receiving, at the second access point from the first access point, a handover preparation request for the user equipment, wherein the obtaining is performed response to receiving the handover preparation request.

The obtaining may comprise: sending, to the radio access node data collection entity, a request for the one or more user equipment specific allocations of a random access preamble and timing information associated with the random access preamble; and receiving, from the radio access node data collection entity, the one or more user equipment specific allocations of a random access preamble and timing information associated with the random access preamble.

The request may comprise at least one of: an identifier of the serving cell of the user equipment; information associated with any active user equipment beams; user equipment capability information; user equipment mobility state information; an estimated arrival probability of the user equipment at the target cell; a list of candidate beams for the user equipment at the target cell; and a current load status of beams and random access channel at the target cell.

The obtaining may comprise: receiving, from the radio access node data collection entity, a list comprising a plurality of user equipment specific allocations of a random access preamble and timing information associated with the random access preamble; and selecting, by the second access point, one of the plurality of user equipment specific allocations of a random access preamble and timing information associated with the random access preamble.

The circuitry may be for: sending, to the radio access node data collection entity, information identifying the selected one of the user equipment specific allocations of a random access preamble and timing information associated with the random access preamble.

The circuitry may be for: responsive to receiving the random access request, sending, to the radio access node data collection entity, information identifying the random access preamble included in the random access request and timing information identifying when the random access request was received by the second access point.

The circuitry may be for: responsive to receiving the random access request, sending, to the first access point, a handover acknowledgement, wherein the handover acknowledgement includes the random access preamble included in the random access request.

According to an aspect, there is provided circuitry for: determining, at a radio access node data collection entity, one or more user equipment specific allocations of a random access preamble and timing information associated with the random access preamble, the timing information indicating when the associated random access preamble is to be used; and sending, from the radio access node data collection entity to a second access point supporting a target cell, the one or more user equipment specific allocations of a random access preamble and timing information associated with the random access preamble.

The circuitry may be for: receiving, from the second access point, a request for the one or more user equipment specific allocations of a random access preamble and timing information associated with the random access preamble, wherein the sending is performed responsive to the receiving.

The one or more user equipment specific allocations of a random access preamble and timing information associated with the random access preamble may comprise a list comprising a plurality of random access preambles and timing information associated with the plurality of random access preambles.

The circuitry may be for: receiving, from the second access point, information identifying a selected random access preamble and timing information associated with the selected random access preamble.

The determining may be based on at least one of: information received from the second access point; information about the random access history of the user equipment; and information about the history of the user equipment slice and/or class and/or type.

The information received from the second access point may comprise at least one of: an identifier of the serving cell of the user equipment; information associated with any active user equipment beams; user equipment capability information; user equipment mobility state information; an estimated arrival probability of the user equipment at the target cell; a list of candidate beams for the user equipment at the target cell; and a current load status of beams and random access channel at the target cell.

The circuitry may be for: receiving from at least a third access point supporting a further target cell, information indicating that at least one of the one or more random access preambles and timing information associated with the one of the one or more random access preambles selected by the second access point has also been selected by the third access point; determining, based on the timing information associated with the at least one of the one or more random access preambles selected by the second access point and the third access point, that an error when performing random access using the at least one of the one or more random access preambles is likely; and sending, to at least one of the second access point and the third access point, information for causing at least one of the second access point and the third access point to select a different random access preamble and/or timing.

The circuitry may be for: receiving, from the second access point, information identifying that one of the one or more random access preambles has been included in the random access request, and timing information identifying when the random access request was received by the second access point.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which.

DETAILED DESCRIPTION

In the following certain embodiments are explained with reference to mobile communication devices capable of communication via a wireless cellular system and mobile communication systems serving such mobile communication devices. Before explaining in detail the exemplifying embodiments, certain general principles of a wireless communication system, access systems thereof, and mobile communication devices are briefly explained with reference to FIGS. 1, 2 and 3 to assist in understanding the technology underlying the described examples.

Figure 1:
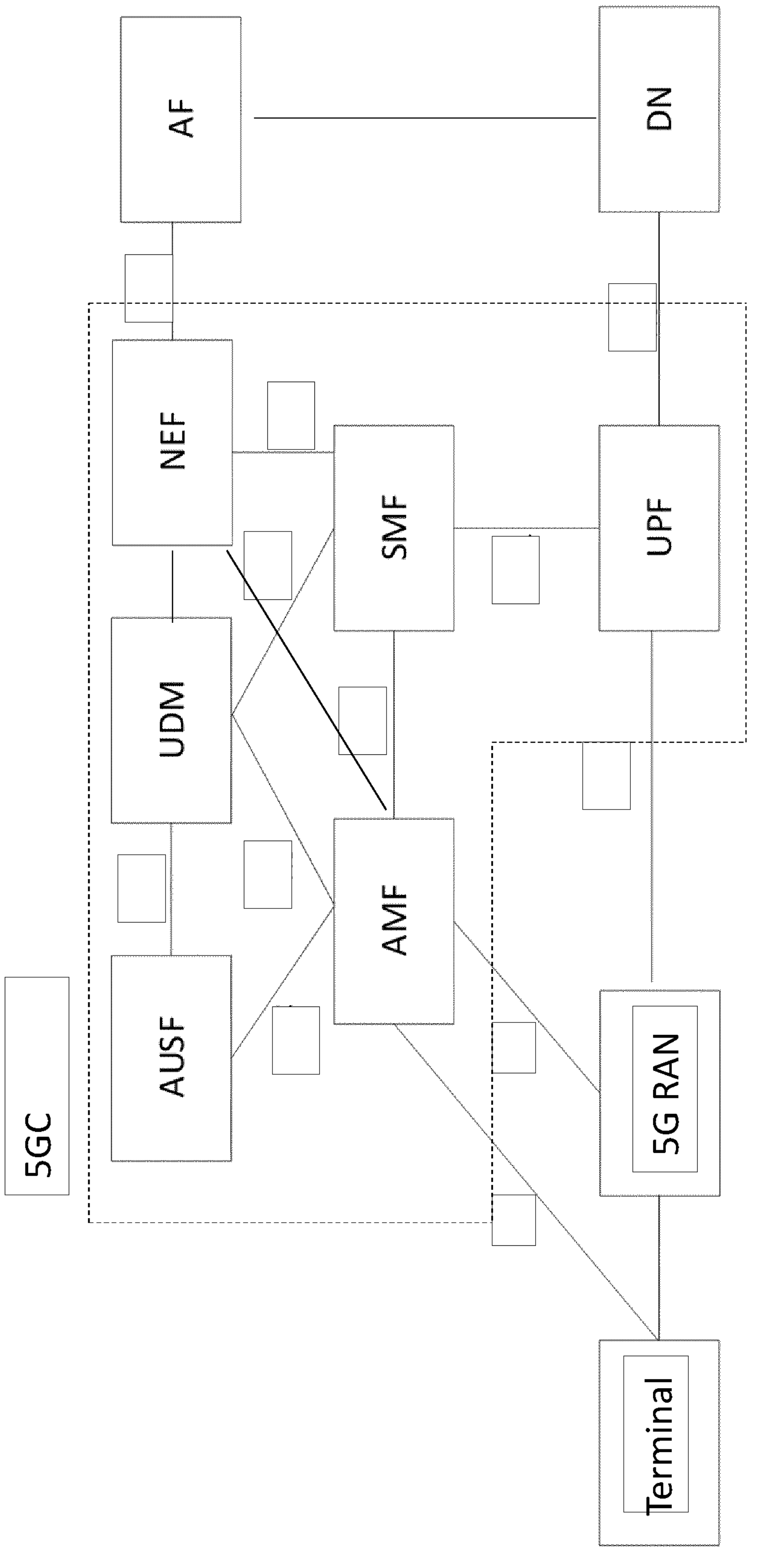
FIG. 1 shows a representation of a network system according to some examples.

FIG. 1 shows a schematic representation of a 5G system (5GS). The 5GS may be comprised by a terminal or user equipment (UE), a 5G radio access network (5GRAN) or next generation radio access network (NG-RAN), a 5G core network (5GC), one or more application function (AF) and one or more data networks (DN).

The 5G-RAN may comprise one or more gNodeB (GNB) or one or more gNodeB (GNB) distributed unit functions connected to one or more gNodeB (GNB) centralized unit functions.

The 5GC may comprise the following entities: Network Slice Selection Function (NSSF); Network Exposure Function; Network Repository Function (NRF); Policy Control Function (PCF); Unified Data Management (UDM); Application Function (AF); Authentication Server Function (AUSF); an Access and Mobility Management Function (AMF); and Session Management Function (SMF).

Figure 2:
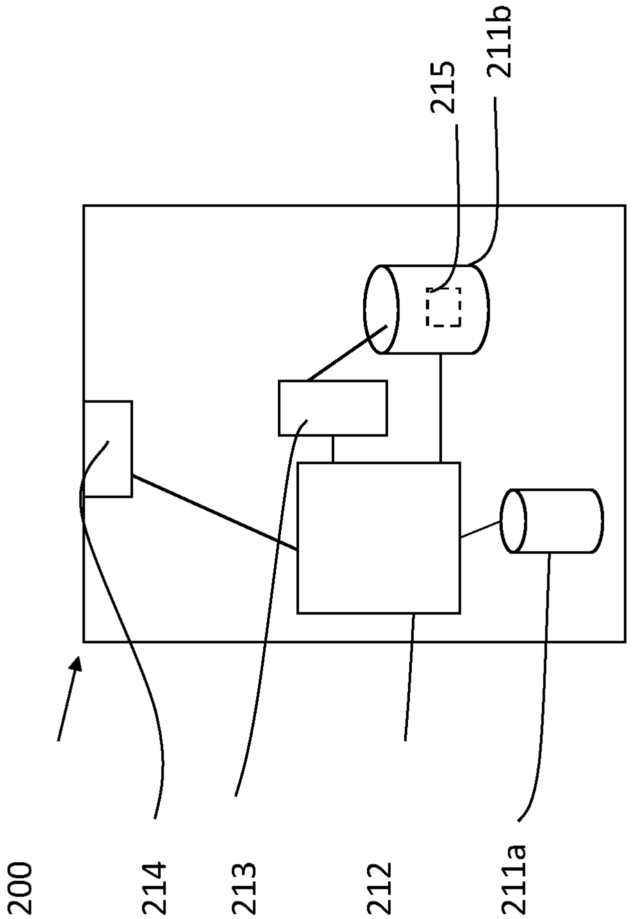
FIG. 2 shows a representation of a control apparatus according to some examples.

FIG. 2 illustrates an example of a control apparatus 200 for controlling a function of the 5GRAN or the 5GC as illustrated on FIG. 1. The control apparatus may comprise at least one random access memory (RAM) 211*a*, at least on read only memory (ROM) 211*b*, at least one processor 212, 213 and an input/output interface 214. The at least one processor 212, 213 may be coupled to the RAM 211*a* and the ROM 211*b*. The at least one processor 212, 213 may be configured to execute an appropriate software code 215. The software code 215 may for example allow to perform one or more steps to perform one or more of the present aspects. The software code 215 may be stored in the ROM 211*b*. The control apparatus 200 may be interconnected with another control apparatus 200 controlling another function of the 5GRAN or the 5GC. In some embodiments, each function of the 5GRAN or the 5GC comprises a control apparatus 200. In alternative embodiments, two or more functions of the 5GRAN or the 5GC may share a control apparatus.

Figure 3:
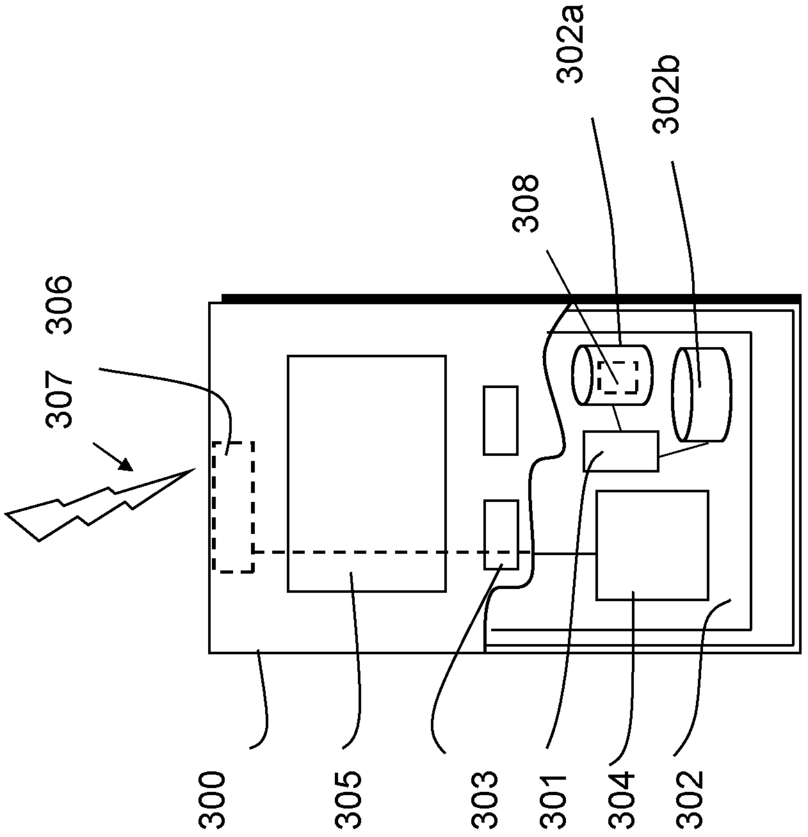
FIG. 3 shows a representation of an apparatus according to some examples.

FIG. 3 illustrates an example of a terminal 300, such as the terminal illustrated on FIG. 1. The terminal 300 may be provided by any device capable of sending and receiving radio signals. Non-limiting examples comprise a user equipment, a mobile station (MS) or mobile device such as a mobile phone or what is known as a 'smart phone', a computer provided with a wireless interface card or other wireless interface facility (e.g., USB dongle), a personal data assistant (PDA) or a tablet provided with wireless communication capabilities, a machine-type communications (MTC) device, an Internet of things (IoT) type communication device or any combinations of these or the like. The terminal 300 may provide, for example, communication of data for carrying communications. The communications may be one or more of voice, electronic mail (email), text message, multimedia, data, machine data and so on.

The terminal 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the mobile device.

The terminal 300 may be provided with at least one processor 301, at least one memory ROM 302*a*, at least one RAM 302*b* and other possible components 303 for use in software and hardware aided execution of tasks it is designed to perform, including control of access to and communications with access systems and other communication devices. The at least one processor 301 is coupled to the RAM 311*a* and the ROM 311*b*. The at least one processor 301 may be configured to execute an appropriate software code 308. The software code 308 may for example allow to perform one or more of the present aspects. The software code 308 may be stored in the ROM 311*b*.

The processor, storage and other relevant control apparatus can be provided on an appropriate circuit board and/or in chipsets. This feature is denoted by reference 304. The device may optionally have a user interface such as key pad 305, touch sensitive screen or pad, combinations thereof or the like. Optionally one or more of a display, a speaker and a microphone may be provided depending on the type of the device.

In a wireless communications network, a user equipment (UE) may establish a connection to the network via a random access procedure. Examples of situations in which random access is performed include handover, beam failure recovery (BFR), Radio Resource Control (RRC) reconfiguration, uplink (UL) sync loss, where no Physical Uplink Control Channel (PUCCH) is available, request of System Information (SI), Scheduling Request (SR) failure, and initial access.

When performing random access, a UE may initiate the connection with network using certain code sequence, which is also known as a preamble. If two UEs use the same code sequence simultaneously, the uplink signals of the UEs may interfere with each other. This may result in the network being unable to decode the signal of those UEs.

There may be 64 orthogonal code sequences (preambles) per RACH occasion that can be used simultaneously by UEs without any collision occurring at the same cell. Those preambles may be categorized into contention-free random access (CFRA) and contention-based random access (CBRA). Once preambles in CFRA (i.e. CFRA preambles) are allocated to a UE, they cannot be used by other UEs simultaneously; whereas in CBRA, preambles ("CBRA preambles") are selected randomly by UEs and so the same preamble may be used by different UEs at the same time. Random selection of CBRA preambles may improve the reuse of the limited number of preambles; however, it may also be susceptible to collision if two or more UEs select the same CBRA preamble simultaneously. This may cause latency in the network particularly proportional with the increasing number of UEs in a cell.

CFRA may be faster than CBRA due to less signalling overhead in case of collision in CBRA. A certain number of the available preambles may be allocated by the network as CFRA preambles, with the remaining preambles being allocated as CBRA preambles. For example, if there are 64 preambles, 10 of them may be configured as CFRA preambles and 54 as CBRA preambles per RACH occasion.

In some cases, a CFRA preamble may be beam-specific. That is to say, for example, a CFRA preamble that is configured for a UE can in some examples be used through specific beam ID. CBRA preambles can in some examples be used through all beams.

In some legacy handover procedures (for example as specified in Rel-15), a UE sends measurement reports to a serving cell. The serving cell determines, based on those measurements, whether handover of the UE's network connection to a target cell is necessary. The serving cell sends, to the target cell, a handover request and UE context information, and the target cell in response sends a handover confirmation along with a new cell radio network temporary identifier (C-RNTI) for the target cell. The serving cell then sends a handover command to the UE along with the new C-RNTI, which causes the UE to establish a connection with the target cell and drop the connection to the serving cell.

In another type of handover, called conditional handover (CHO), a UE is configured with a CHO command containing the target cell configuration and a condition to execute the handover for one or multiple target cells. This may be called CHO preparation. The handover execution condition may be based on radio measurements meeting the condition.

In CHO, the target cell may have reserved a CFRA preamble for the UE. This preamble is communicated to the UE in the CHO command. When UE evaluates the CHO condition and the condition is satisfied for a specific target cell, the UE executes the CHO command and may use the reserved CFRA preamble given in the CHO command to initiate the random access to the target cell. In some cases, a UE can be configured with multiple conditions for multiple target cells.

Figure 4:
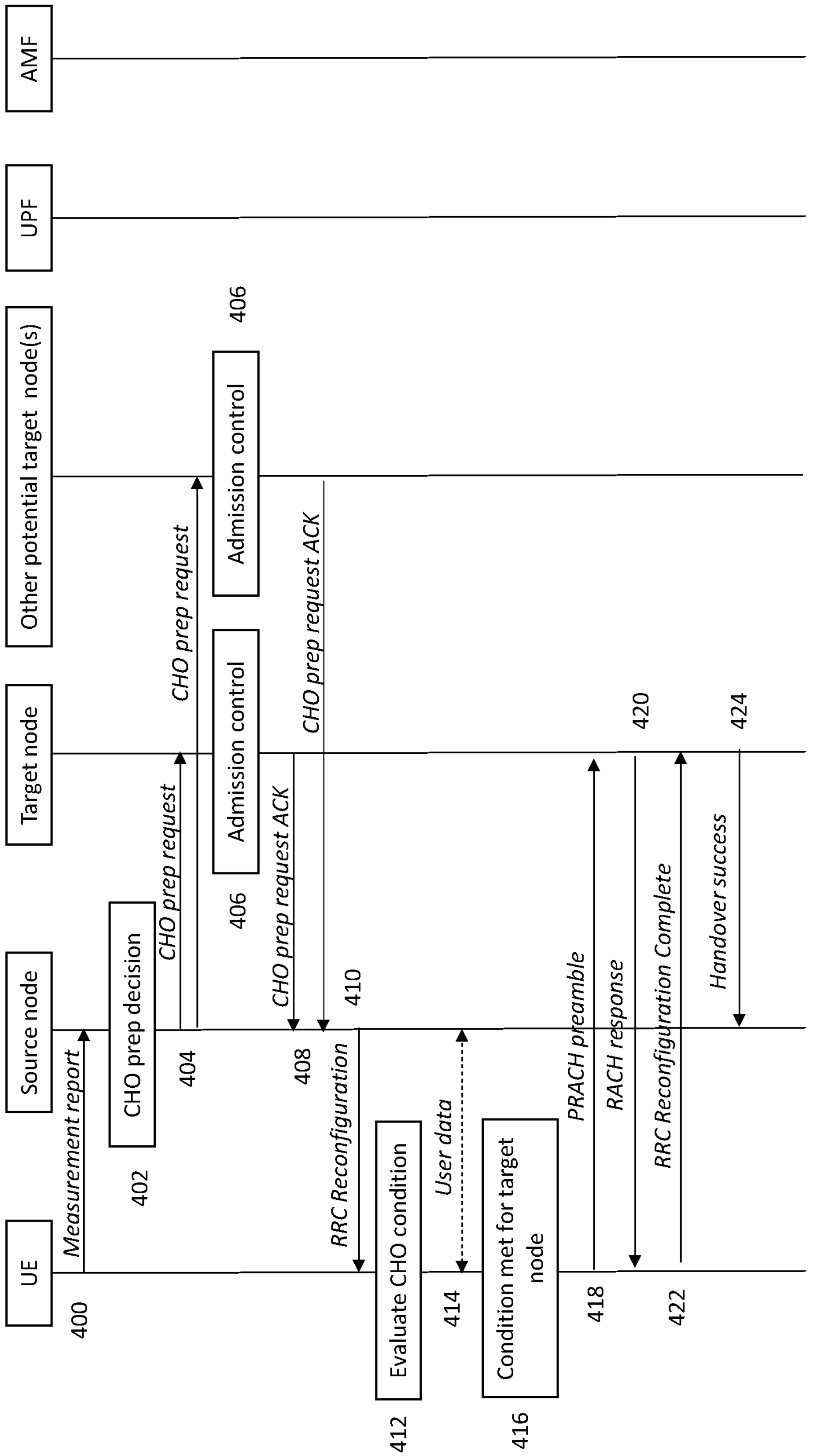
FIG. 4 shows a signalling exchange for conditional handover.
Figure 4:
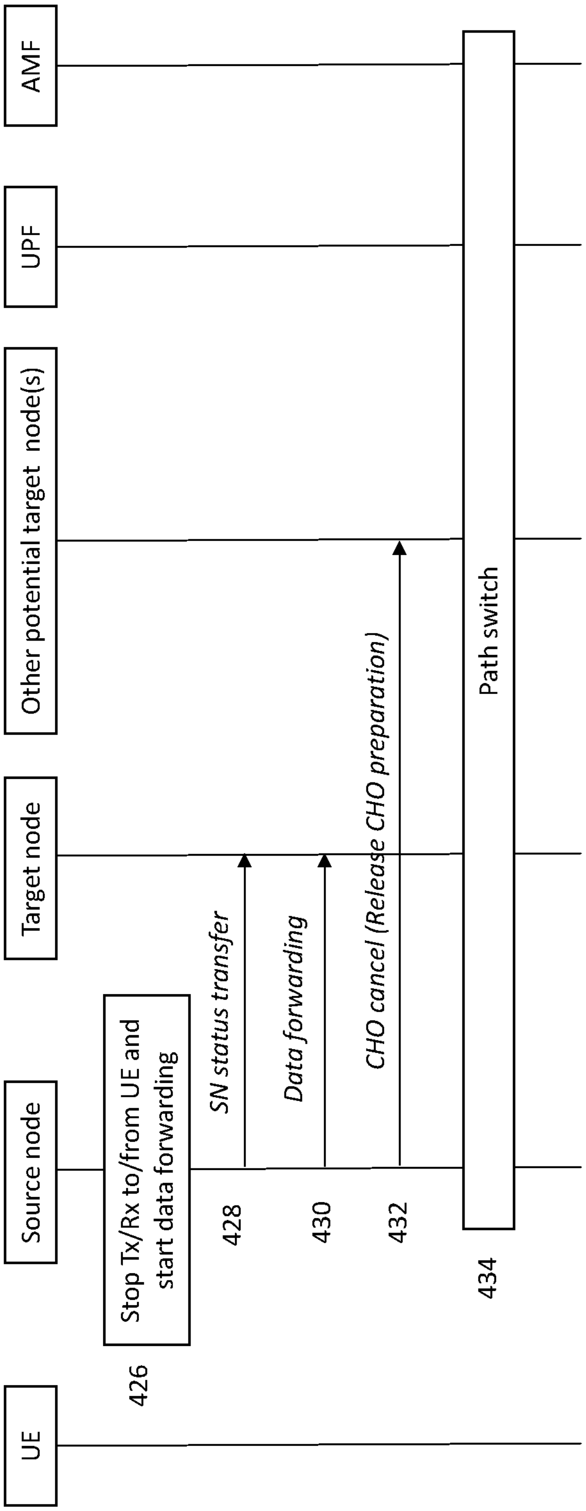

Reference is made to FIG. 4, which shows an example signalling exchange for CHO.

In the example of FIG. 4, a network comprises a source node, a target node, and other potential target node(s). The core network comprises a UPF and AMF. A UE is initially in communication with a source node.

At 400, the UE sends, to the source node, a measurement report.

At 402, based on the measurement report, the source node determines that CHO preparation is needed.

At 404, responsive to the decision, the source node sends a CHO preparation request to the target node and the other potential target node(s).

At 406, the target node and the other potential target node(s) perform admission control based on the request of 404.

At 408, responsive to the admission control procedure at the respective target node approving the CHO request at 406, the target node and/or the other potential target node(s) send a CHO preparation request acknowledgement to the source node.

At 410, the source node sends an RRC reconfiguration message to the UE. The RRC reconfiguration message comprises a CHO condition associated with the target node and the other potential target node(s), wherein the UE is configured to perform handover to the respective node if the associated condition is met.

At 412, the UE evaluates the condition for CHO.

At 414, the UE exchanges user data with the source node.

At 416, the UE determines that the CHO condition is met for the target node, triggering the conditional handover.

At 418, the UE sends a PRACH preamble to the target node. The PRACH preamble may have been allocated to the UE in the RRC Reconfiguration message.

At 420, in response to receiving the PRACH preamble, the target node sends a RACH response to the UE.

At 422, in response to receiving the RACH response, the UE sends an RRC Reconfiguration Complete message to the target node.

At 424, in response to receiving the RRC Reconfiguration Complete message, the target node sends an indication of handover success to the source node.

At 426, in response to receiving the indication of handover success, the source node stops transmission to and reception from the UE and determines to forward data for the UE to the target node.

At 428, the source node transfers source node status information to the target node.

At 430, the source node forwards user data received from the UE to the target node.

At 432, the source node sends a CHO cancel message to the other potential target node(s), which causes the other potential target node(s) to release resources that were previously allocated for CHO of the UE.

At 434, the handover is complete, and the communication path between the UE and the core network is switched to be via the target node.

CHO may improve the mobility robustness such that UE can execute the handover without the need of the serving cell to trigger the handover execution (Step 416 of FIG. 4) after the measurement.

In other words, an advantage of the CHO is that the CHO command can be sent very early compared to legacy HO, ensuring that the UE is served still safe in the source cell at the time of CHO command reception, without risking the access in the target cell and the stability of its radio link.

CHO may allow for both early and late data forwarding. In early data forwarding, the source cell can start to forward the user plane data to all prepared target cells when sending the CHO command (410 of FIG. 4). In late data forwarding (shown in step 430 of FIG. 4), the source cell starts data forwarding when it receives "Handover Success" message from the target cell which is sent after the CHO execution is completed. The source cell releases all the remaining CHO preparations (and the associated radio resources) by sending "CHO Cancel" to the candidate target PCells which have not been accessed by the UE.

Although CHO may be useful in enhancing the mobility robustness, it may have the following additional challenges and complexity compared to the legacy handover procedure (s) used in NR (New Radio) Rel. 15:

1. In CHO, multiple target cells may be prepared, where each target cell has to reserve radio resources for some time. For example, resources may be reserved for up to 10 sec in some cases.
2. Each CHO configuration for a prepared target cell may require a prior reservation of contention free preambles and a prior radio signalling, i.e., CHO Prep. Request (step 404), CHO Prep. Req. Ack (step 408), RRC Reconfiguration (step 410).

3. Each CHO configuration means a target cell commits to supporting DRBs of the UE through admission control. This support means the target cell would fulfil the QoS requirements of DRBs upon handover.

As explained above, the number of CFRA preambles may be limited.

Both legacy handover and CHO require CFRA preambles to be reserved at the target cell for the UE. In legacy handover, the UE executes the handover command immediately after receiving it, and so the CFRA resources may only be allocated for a short duration. However, in CHO, it is not known when the UE will execute the handover. Execution of the handover can, for example, vary between 100 ms up to 10 s. Thus, the target cell may be unable to utilise the CFRA preamble for other UEs for an extended period of time.

The impact on the network may be further compounded by the fact that multiple target cells can be prepared for CHO of a UE at the same time. Thus, multiple CFRA preambles may be allocated for the same UE on different cells. For example, if a UE has CFRA preambles reserved on three target cells, a worst-case scenario may be that 30 seconds of preamble reservation is required. This becomes even more critical if the target cells reserve more than one RACH preamble per UE.

If there are no CFRA preambles available (which may be due to CHO allocation or legacy allocation), other UEs may have to rely on CBRA preambles to access the target cell(s), which as explained above, may be less reliable due to possible interference with other UEs using the same CBRA preamble.

Furthermore, CBRA preambles may be shared for many other purposes such as scheduling request, transition to connected state, UL sync lost and many more. Mobility procedures aim to avoid this contention issue via using contention free preambles. However, the limited number of contention free preambles poses a bottleneck, an example of which is shown in FIG. 5.

Figure 5:
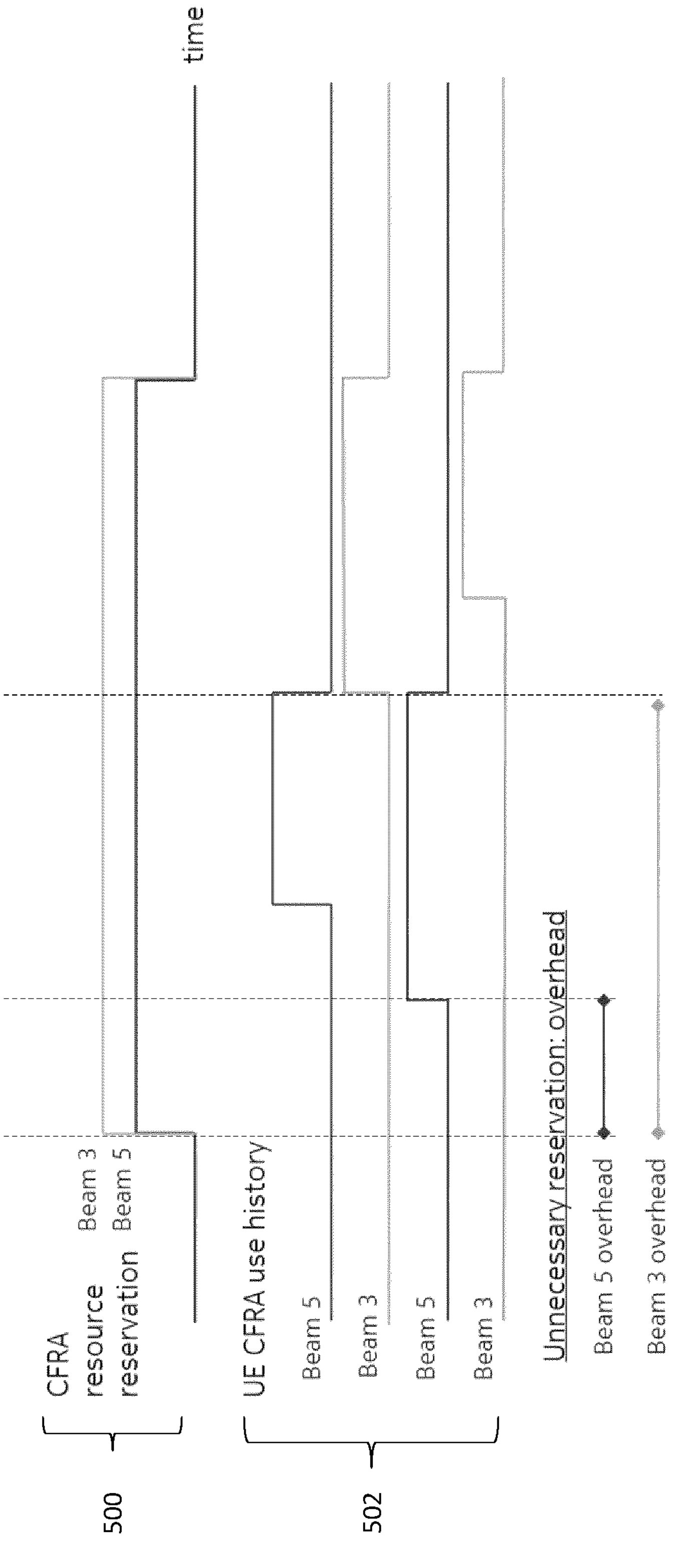
FIG. 5 shows an example contention free random access resource allocation and use history.

In the example of FIG. 5, as shown in the CFRA resource reservation portion 500, the UE is reserved with CFRA preamble 1 at beam 3 and CFRA preamble 2 at beam 5.

However, when looking at the UE CFRA use history portion 502, it can be seen that the UE made use of beam 5 first only after 100 ms after the preamble was reserved; and for beam 3 it was only after 1 second after the preamble was reserved. Thus, preamble 1 at beam 3 was reserved unnecessarily for 1 second and preamble 2 at beam 5 was reserved unnecessarily for 100 ms.

Furthermore, FIG. 5 also illustrates the use of different CFRA preambles on different beams. Multiple CFRA preambles may be allocated for multiple beams. However, the UE never uses the same CFRA preamble on two different beams. That is to say, from the UE's perspective, CFRA preambles used are beam specific. This may lead to inefficient reservation of the beams or CFRA preambles for those beams, as certain CFRA preambles or beams may not be used.

Thus, while CHO may be beneficial from the UE's perspective, it may negatively impact on network efficiency.

To avoid these issues, one possibility is to allocate CBRA preambles to UEs. However, as explained above, CBRA preambles may be selected randomly by UEs, which may lead to two or more UEs selected the same preamble, which causes interference and may increase latency and/or result in handover failure.

Another possibility is to implement a timer to switch from CFRA preamble use to CBRA preamble use. However, this may not solve the abovementioned problems. As network may not know when exactly this timer is started, the network may not free up the CFRA preamble to allocate it to other UEs.

In some methods for conditional handover, the source cell can autonomously administrate a pool of CFRA resources from a target cell. The pool may be provided by the source cell before, during or after the preparation of the conditional handover. The source cell can autonomously assign these resources to UEs, which are configured for CHO to this target, and which indicate by appropriate measurement reports that the current CFRA configuration is outdated, i.e. that the UE will most likely access the target via a different beam than originally configured.

This may reduce the time that the network needs to update the CFRA preamble for the UE and may increase the chance that the UE performs access using CFRA. Nevertheless, the target cell still has to reserve a pool of CFRA resources that are autonomously administrated by the source cell.

Reference is made to FIG. 6, which shows a method according to some example embodiments.

Figure 6A:
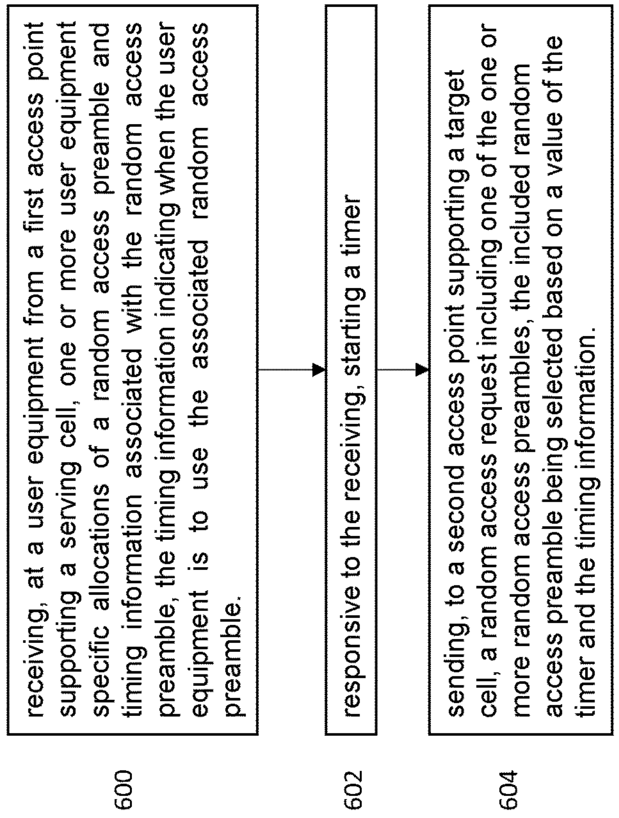
FIG. 6 shows various methods according to some examples.

Reference is made to FIG. 6*a*, which shows a method which may be performed by or at a user equipment.

At 600, the method comprises receiving, at a user equipment from a first access point supporting a serving cell, one or more user equipment specific allocations of a random access preamble and timing information associated with the random access preamble, the timing information indicating when the user equipment is to use the associated random access preamble.

At 602, the method comprises, responsive to the receiving, starting a timer.

At 604, the method comprises sending, to a second access point supporting a target cell, a random access request including one of the one or more random access preambles, the included random access preamble being selected based on a value of the timer and the timing information.

Figure 6B:
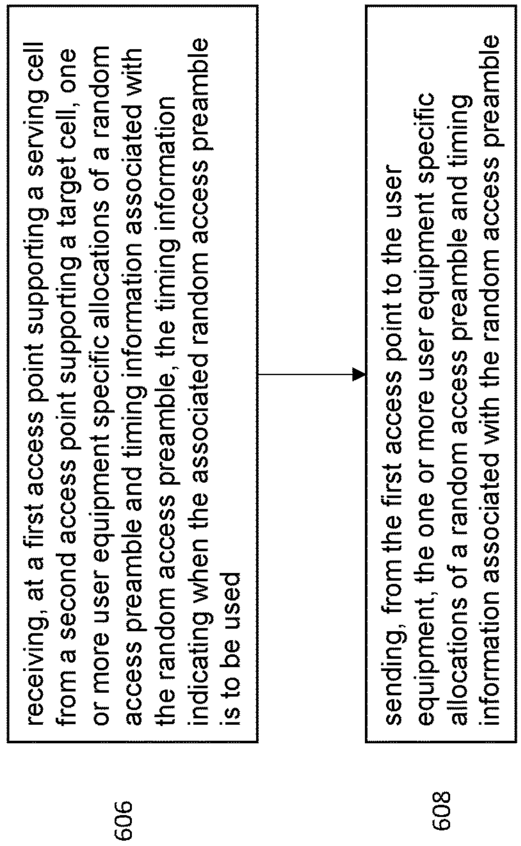

Reference is made to FIG. 6*b*, which shows a method which may be performed by or at an access point supporting a serving cell.

At 606, the method comprises receiving, at a first access point supporting a serving cell from a second access point supporting a target cell, one or more user equipment specific allocations of a random access preamble and timing information associated with the random access preamble, the timing information indicating when the associated random access preamble is to be used.

At 608, the method comprises sending, from the first access point to the user equipment, the one or more user equipment specific allocations of a random access preamble and timing information associated with the random access preamble.

Figure 6C:
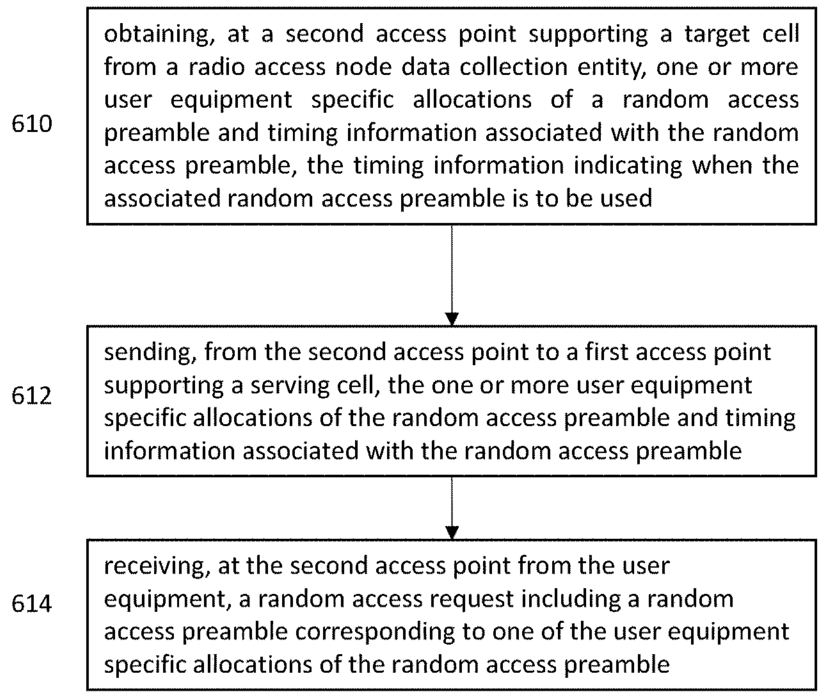

Reference is made to FIG. 6*c*, which shows a method which may be performed by or at an access point supporting a target cell.

At 610, the method comprises obtaining, at a second access point supporting a target cell from a radio access node data collection entity, one or more user equipment specific allocations of a random access preamble and timing information associated with the random access preamble, the timing information indicating when the associated random access preamble is to be used.

At 612, the method comprises sending, from the second access point to a first access point supporting a serving cell, the one or more user equipment specific allocations of the random access preamble and timing information associated with the random access preamble.

At 614, the method comprises receiving, at the second access point from the user equipment, a random access request including a random access preamble corresponding to one of the user equipment specific allocations of the random access preamble.

Figure 6D:
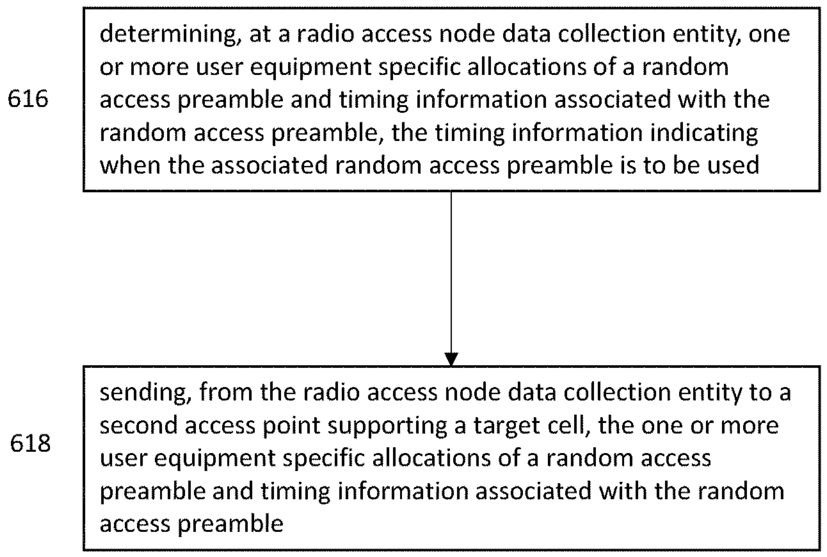

Reference is made to FIG. 6*d*, which shows a method which may be performed by or at a radio access node data collection entity.

At 616, the method comprises determining, at a radio access node data collection entity, one or more user equipment specific allocations of a random access preamble and timing information associated with the random access preamble, the timing information indicating when the associated random access preamble is to be used.

At 618, the method comprises sending, from the radio access node data collection entity to a second access point supporting a target cell, the one or more user equipment specific allocations of a random access preamble and timing information associated with the random access preamble.

In some examples, a time allocation is provided for preambles allocated for mobility procedures. Timing information associating a contention free or contention based preamble with a specific timing instant is provided to the user equipment. The timing instant may, for example, be a radio frame. The preambles may be associated with a specific beam.

Figure 8:
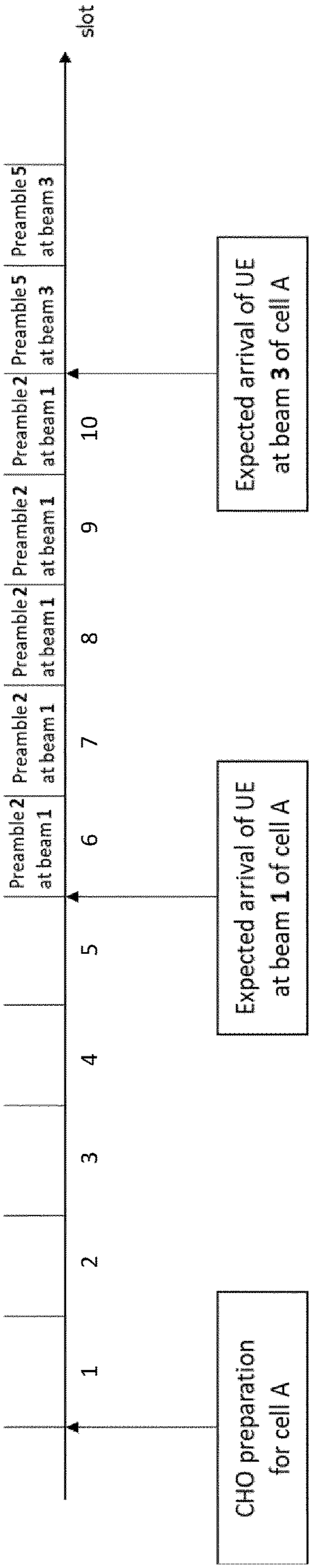
FIG. 8 shows an example of contention free random access preamble selection dependent on timing information.

The UE may use the timing information to determine which preamble to use for random access. For example, as shown in FIG. 8, the UE may use CFRA preamble 2 on beam 1 between time instants or slots 5 and 10, after which they UE may use CFRA preamble 5 on beam 3, and may otherwise use a CBRA preamble.

This may enable the network to efficiently allocate CFRA preambles and achieve multiplexing gain by allocating the same CFRA preamble to multiple devices with different timing instants without breaking the contention free paradigm.

From the UE's perspective, the UE may have access to different contention free preambles depending on the timing of the handover execution. The UE can control this through a timer whose value determines which CFRA preamble to use. The timer can be used to log UE access attempts relative to the CHO command reception.

From the network's perspective, the network can deterministically control at which time the UE should use which preambles. This may enable CHO preamble allocation optimization, or the expiry of some preamble after some time without extra RRC signalling.

Preamble allocation coordination may be enabled, and CHO resource reservation optimization may be enabled. Preamble timings may reported to RAN data collection entity for subsequent rounds of preamble allocation.

Figure 7:
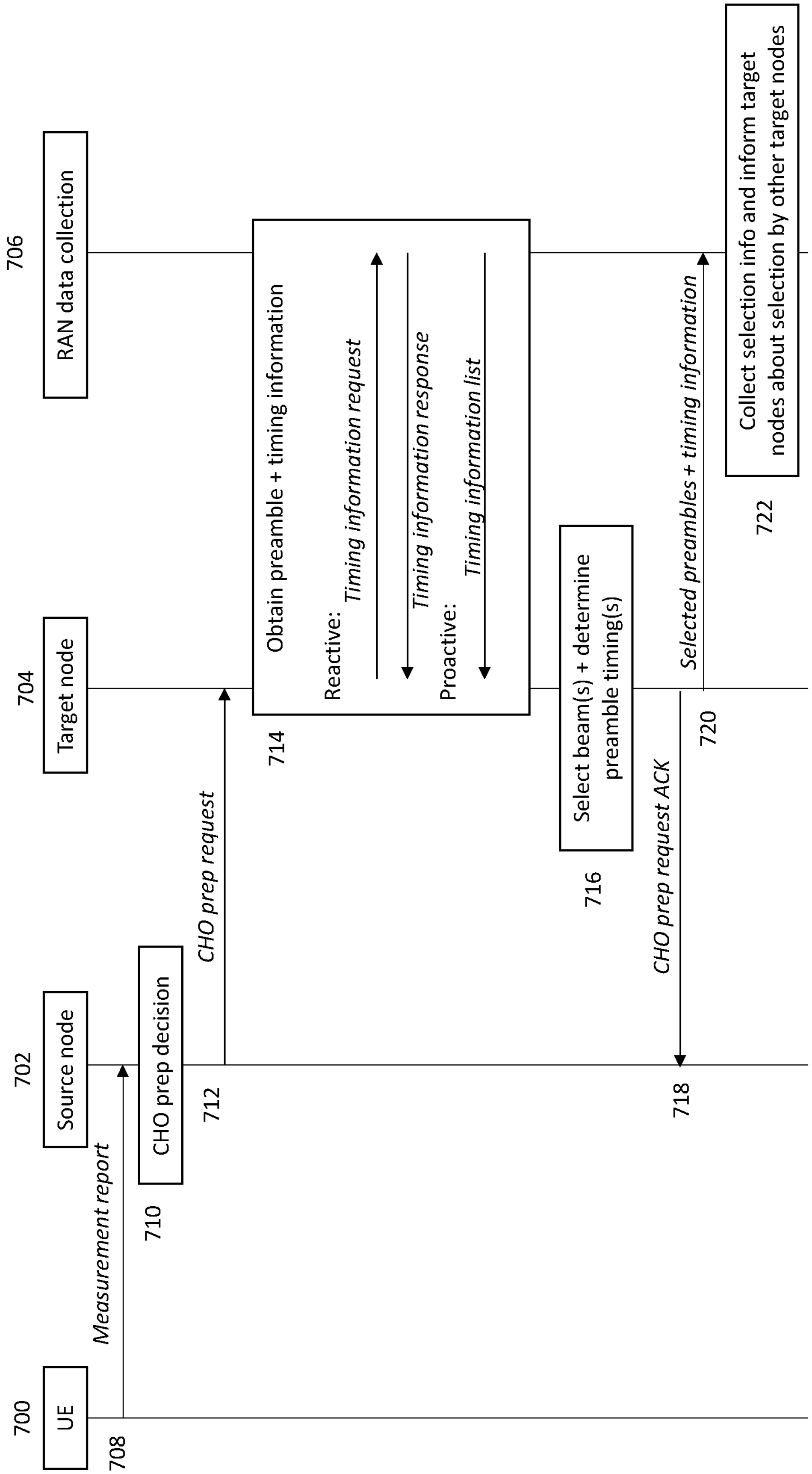
FIG. 7 shows a signalling exchange according to some examples.
Figure 7:
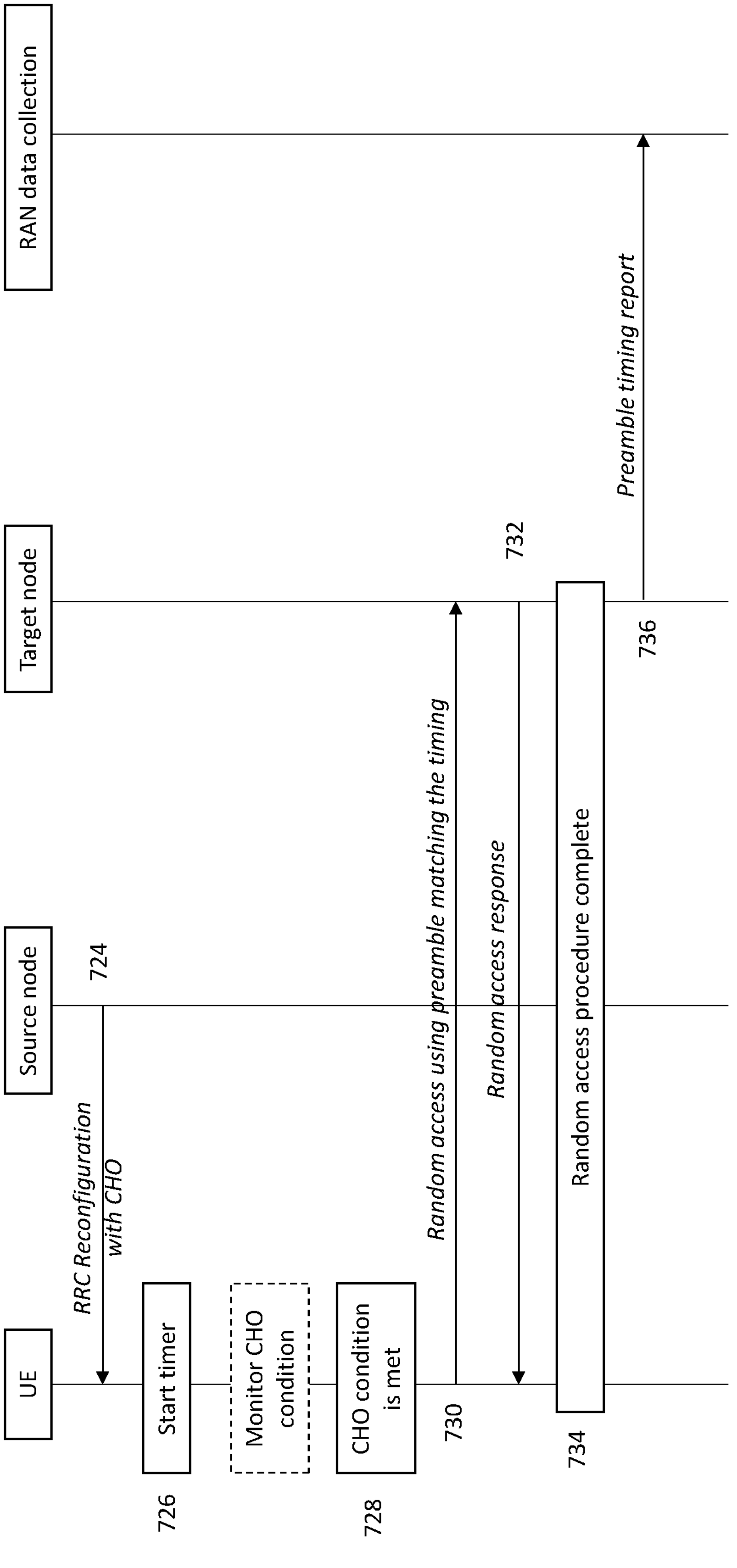

Reference is made to FIG. 7, which shows a signaling exchange according to some examples.

In the examples of FIG. 7, a UE 700 is initially connected to source node 702. Source node 702 is in communication with target node 704, which is also in communication with RAN data collection entity 706. In some examples, RAN data collection entity 706 may be located in the target node 704, source node 702, or at near real-time RAN intelligent controller (RT RIC). In some examples, the RAN data collection entity 706 may be located within the target node in order to reduce any extra signalling delay. The source node and target node may, for example, be an access point such as a gNB.

At 708, UE 700 provides a measurement report to source node 702. The measurement report includes measurements associated with at least the target node 704. The measurement report may also include measurements associated with other neighbouring cells or nodes. The measurements may, for example, comprise reference signal received power (RSRP) measurements.

At 710, source node 702 determines that conditional handover preparation is necessary for UE 700. The determination at 710 may be based on the measurement report provided by UE 700 at 708.

At 712, source node 702 sends a CHO preparation request to target node 704. Target node 704 may be selected based on the measurement report received by source node 702 at step 708. Source node 702 may also select one or more further target nodes (not shown) and send a CHO preparation request to the selected one or more further target nodes.

At 714, target node 704 obtains one or more preambles and timing information associated with the determined one or more preambles. As described previously, the timing information may associate a contention free or contention based preamble of the target node 704 with a specific timing instant. The timing instant may, for example, be a radio frame, subframe, slot or a specific symbol. The preambles may be associated with a specific beam of the target node 704.

In some examples, step 714 may comprise obtaining the timing information from RAN data collection entity 706. The target node may send a request for timing information for UE 700 to RAN data collection entity 706. The request may include information from the CHO preparation request received by target node 704 from source node 702. The request may include information for identifying the UE 700. The request may include measurement reports from the UE.

In some examples, the request for timing information may include at least one of the following:

- an identifier of the source node;
- information associated with any active UE beams;
- UE capability information;
- UE mobility state information;
- estimated probability of handover happening to the target cell in the case of CHO;
- a list of candidate beams for the UE at the target node; and
- current load status of the beams and RACH at the target node.

In response, RAN data collection entity 706 may provide the timing information to target node 704. RAN data collection entity 706 may determine the timing information based on the information provided by target node 704, and optionally information about the history of the UE and/or the history of the UE slice/class/type.

The timing information indicates at least one preamble timing for at least one beam of target node cell 704. The timing information may be associated with a single beam, or may be provided for all candidate beams at the target node 704. Each timing may be indicated with an 8 bit octet that is valid for 256 frames. The granularity of the timing information may be per radio frame. The information size and granularity can be adjusted in case other timing information used. The timing information may also indicate that the UE can use a next frame for preamble transmission after the handover command is received.

In another example, RAN data collection entity 706 may configure a look-up table to the target node 704. The look-up table may comprise the timing information as described previously, and may include a list of timings and preambles for different UEs. In some examples, the table may also include timing information for different measurement information (such as RSRP measurements) provided to the target node 704.

Thus, the target node 704 may determine, for a specific UE 700, the one or more preambles and timing information associated with the one or more preambles based on information received from the RAN data collection entity 706. This may be done as described above by the RAN data collection entity re-actively providing the target node with the timing information in response to the target node requesting the timing information, or proactively sending the look-up table including the timing information.

At 716, target node 704 selects one or more beams and determines one or more preambles and related timings for those beams based on the obtained preambles and timing information.

The preambles may be contention-free and/or contention-based preambles (e.g. CFRA preambles and/or CBRA preambles). The information obtained from the RAN data collection entity 706 may indicate whether the preamble is contention-free or contention-based. In some examples, the target node 704 may determine that one or more of the candidate beams are not to be used. The target node 704 may, in some examples, override timing information obtained from the RAN data collection entity 706 after asking for approval from the RAN data collection entity 706. This may allow the target node 704 to utilise some preambles in a different way to those allocated, subject to approval by the RAN data collection entity.

At 718, target node 704 sends a CHO preparation request acknowledgement including the timing information for the one or more preambles selected at 716 to the source node 702. Additionally, at 720, target node 704 also informs the RAN data collection entity 706 of the preamble(s) and associated timing information selected by the target node 704 at step 716.

In the case where multiple target nodes are being configured for conditional handover for a same UE, each of the possible target nodes may perform the previously described steps 714, 716 and 720.

At 722, RAN data collection entity 706 collects information about the selected preamble(s) and associated timing information from the target nodes being configured for the same UE. The collected information may also comprise an indication of which beam(s) have been selected by each of the target nodes.

In some examples, RAN data collection entity 706 may determine, based on the collected information, whether two or more of the target nodes have selected overlapping timings for a given preamble. RAN data collection entity 706 may inform one or more target node(s) about preamble selection(s) and associated timing information performed by other target node(s).

At 724, source node 702 sends an RRC reconfiguration message with the timing information and one or more preambles received at step 718 to UE 700. The RRC reconfiguration message also includes at least one condition for triggering the conditional handover.

In some examples, multiple target nodes may select overlapping timings for a given preamble. In such cases, source node 702 may decide not to send the RRC reconfiguration message to the UE if the source node 702 determines that there are overlapping timings. This is made feasible via configuring the timing information outside of the RRC Reconfiguration to be decodable by the source node.

At 726, upon receiving the RRC reconfiguration message with the timing information and one or more preambles, UE 700 starts a timer. The UE uses the value of the timer to determine a time instant for selecting a corresponding preamble/beam based on the timing information. This determination may be done after UE measured beams for their received signal strengths. The timer may for example be RACH timer T212.

The timer may initially be set to a value of zero upon receiving the reconfiguration message. The timer may be incremented by one at the end of each radio frame elapsed. If a contention resolution message is received from the network, the timer may be stopped. In some examples, if the timer expires (i.e. reaches a certain value), the UE may fall back to a contention based random access procedure when performing conditional handover.

At 728, UE 700 determines that the at least one condition for triggering the conditional handover is met. In some examples, this may comprise determining that the at least one condition has been met for a certain amount of time. For example, the UE 700 may determine whether the RSRP associated with the target node 704 is above a certain threshold for a certain amount of time.

At 730, response to the determining at 728, UE 700 initiates random access to the target node 704. Random access is initiated based on the timing information and the value of the timer. The UE 700 may select and utilise the random access preamble associated with the timing information corresponding to the value of the timer. Initiating random access may comprise sending, by the UE 700 to the target node 704, a random access request including the selected random access preamble.

In some examples, UE 700 may determine, for the candidate beams of the target node(s), whether the beam power is above a certain threshold, and make a list of those candidate beams which meet the criteria. The UE 700 may use the timer, such as timer T212, and compare against the preamble timing information to select from among the list of candidate beams which beam to select for performing handover. UE 700 may log the value of the timer when each random access attempt is made.

In some examples, if no preamble timing is available for random access, the UE 700 may decide to postpone the random access procedure.

At 732, UE 700 receives a random access response from target node 704 in response to sending the random access request at 730, and completes the random access procedure at 734.

If no random access response is received from target node 704 within a certain time period, the UE 700 may select a different random access preamble or a different beam, again using the value of the timer and the preamble timing information. In some examples, the certain time period may be defined by a further timer.

After successful handover of UE 700 to the target node 704, at 736 the target node 704 may send a preamble timing report to the RAN data collection entity 706. The preamble timing report may comprise logged values of the timer when each random access attempt was made, which may be sent from the UE 700 to the target node 704. RAN data collection entity 706 may use information from the preamble timing report for future preamble timing allocation.

Figure 9A:
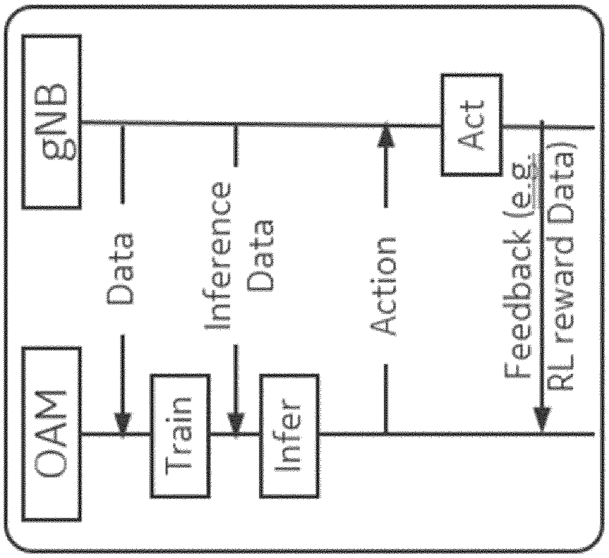
FIG. 9 shows example AI/ML methods for obtaining preamble timings according to two different RAN architectures.
Figure 9B:
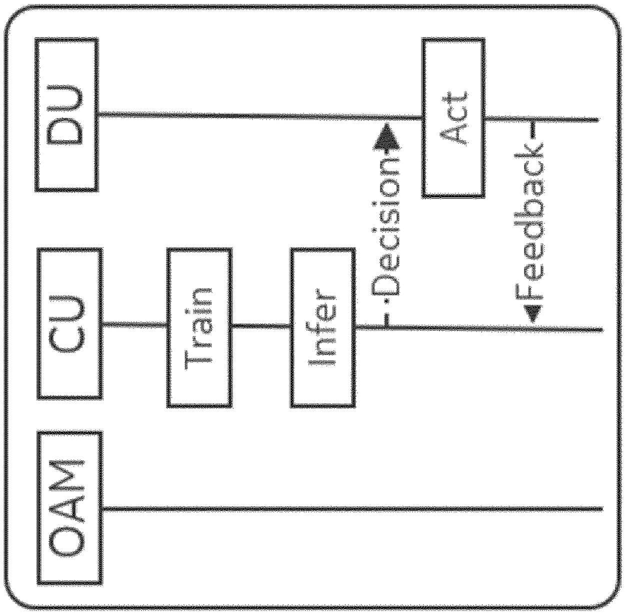

In some examples, the preamble timing information may be based on data collected from multiple events on a cell-pair basis and/or beam-pair basis. Here, AI/ML methods can be utilized to obtain the preamble timings factoring in the collected data. Depending on the RAN architecture and the implementation of the AI/ML mechanisms, AI/ML models and the inference can be executed by different network elements. FIG. 9 presents two example options where the option in FIG. 9*a* is based on a non-split architecture and the option in FIG. 9*b* is based on the split-architecture.

In CHO, UE may request handover preparation and then perform handover execution towards target cell. There may be a time difference between preparation and execution. If the execution times (or access times) of UEs are known or could be estimated for each UE, the same preamble can be allocated to different UEs and they may perform random access at different time instants without any collision.

In mobile networks, UE mobility may follow a certain behaviour over time. The time period between handover preparation and handover execution may show a distinct pattern between cell-pairs. This may, for example, be due to the nature of mobility environment, such as structured streets, pedestrian ways, roads etc.

The source cell can include an "Estimated Arrival Probability" in handover request message that is specified in TS 38.423. Estimated arrival probability is a measure that indicates the likelihood of handover of the UE on that target cell. Having sent that information from source cell, the target cell/RAN Collection entity can in some examples determine the possible contention between the UEs that requests handover and allocate preamble timing to multiple UEs accordingly.

As an example: UEs request handover preparation to handover from cell A to B. The allocated CFRA preambles are not used until a handover execution condition is satisfied. For each CFRA allocation, the network knows that the CFRA preambles will not be used by the UE immediately since the handover execution condition is not satisfied immediately. Therefore, use of CFRA allocation will be subject to a time period which is controlled by the function f_RACH. Ensuring that the CFRA preambles are used only in a certain time frame may enable allocation of those CFRA resources to other UEs without any risk of collision.

Various time durations may be used to calculate valid timings for the RACH resource:

1) The time from step 718 to step 724 of FIG. 7 can be considered as a deterministic overhead.
2) Spatial location of beams: if a UE has to enter beam 1 before it enters beam 2, then a consecutive timing allocation for two beams may be applied. While this may mean that the exact timing of the UE cannot be known, so UE may need to fallback to CBRA if this is done non-ideally, it may reduce the signalling requirements.
3) Statistical approach: If there is no UE coming from Cell A initiating random access with target cell B before "t=100 ms", it may be assumed that this will be also the case for next UEs. If there is no UE coming from Cell B initiating random access with target cell B later than "t=3 s", it may be assumed that this will be also the case for next UEs.

As mentioned above, in some examples, the RAN data collection entity can collect information from one or more UEs relating to the use of different preambles for random access. The RAN data collection entity can use this information to perform statistical modelling for making future preamble allocation decisions.

For example, having collected information about preamble access time from a plurality of UEs after CHO RRC Reconfiguration message is sent to the UE, the RAN data collection entity may generate a histogram of the preamble access times. A hypothetical histogram is shown in FIG. 10.

Figure 10:
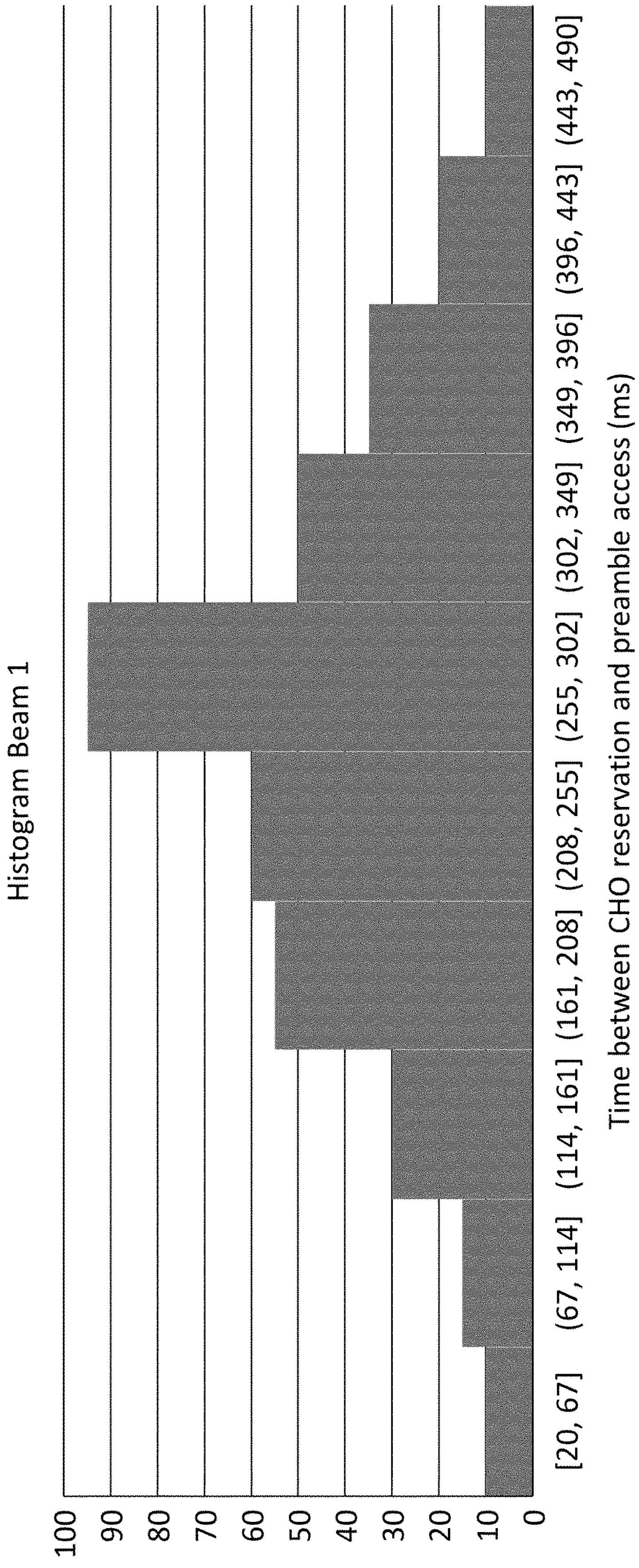
FIG. 10 shows a hypothetical histogram of the time between conditional handover reservation and preamble access.

It can be seen from the histogram of FIG. 10 that the most common preamble access time is between 255 and 300 ms, and so for future preamble timing allocations, the RAN data collection entity may be more likely to allocate preamble timings between 255 and 300 ms.

As a further example illustrating some of the concepts discussed herein, consider a scenario where UE1 and UE2 report measurements indicating beam A and beam B as the strongest beam measurement of a target cell in an L3 measurement report. This measurement reporting may trigger conditional handover. We further assume that UE1 and UE2 both report the L3 measurement report at the same time instant t1.

It is expected in this example that UE1 will be served by beam B for the first four radio frames after t1, and then by beam A for the next four radio frames. Similarly, it is expected that UE2 will be served by beam A for the first four radio frames after t1, and then by beam B for the next four radio frames, as depicted below in Table 1.

TABLE 1 expected serving beams for UE1 and UE2

| | | | | | | | | |
|---|---|---|---|---|---|---|---|---|
| UE1 | B | B | B | B | A | A | A | A |
| UE2 | A | A | A | A | B | B | B | B |
| Frame | 1 | 2 | 3 | 4 | 5 | 6 | 7 | 8 |

According to legacy handover mechanisms, then for UE1, the target cell may allocate CFRA preamble 1 for beam A and CFRA preamble 2 for beam B. For UE2, the target cell may allocate CFRA preamble 3 for beam A and CFRA preamble 4 for beam B. Thus, a total of four CFRA preambles may be allocated. Table 2 shows a representation of the preamble and beam allocation according to this scenario.

TABLE 2

CFRA preamble to be used for CHO execution for UE1 and UE2 according to legacy mechanism

| | | | | | | | | |
|---|---|---|---|---|---|---|---|---|
| UE1 preamble | 2 | 2 | 2 | 2 | 1 | 1 | 1 | 1 |
| UE1 beam | B | B | B | B | A | A | A | A |
| UE2 preamble | 3 | 3 | 3 | 3 | 4 | 4 | 4 | 4 |
| UE2 beam | A | A | A | A | B | B | B | B |
| Frame | 1 | 2 | 3 | 4 | 5 | 6 | 7 | 8 |

When applying aspects of the present disclosure to the same scenario, the target cell may allocate, to UE1 and UE2, CFRA preamble 1 for radio frames where beam A is expected to be the serving beam, and CFRA preamble 2 for radio frames where beam B is expected to be the serving beam. Thus, only two CFRA preambles are required for allocation. This may enable multiplexing gains if UE1 and UE2 have non-overlapping (in time) serving beams.

TABLE 3

CFRA preamble to be used for CHO execution for UE1 and UE2 according to aspects of present disclosure

| | | | | | | | | |
|---|---|---|---|---|---|---|---|---|
| UE1 preamble | 2 | 2 | 2 | 2 | 1 | 1 | 1 | 1 |
| UE1 beam | B | B | B | B | A | A | A | A |
| UE2 preamble | 1 | 1 | 1 | 1 | 2 | 2 | 2 | 2 |
| UE2 beam | A | A | A | A | B | B | B | B |
| Frame | 1 | 2 | 3 | 4 | 5 | 6 | 7 | 8 |

Such an allocation may not be possible with legacy mechanisms.

Thus, by providing timing information associated with a random access preamble, some examples may allow for the network to make use of more flexible preamble allocation. The network may increase the number of available contention free preambles using time multiplexing. As a result, the overall efficiency of the network may be improved.

It should be understood that while some of the above-mentioned examples relate to conditional handover, embodiments and concepts of the present application need not be limited to conditional handover, but may be applied to any situation where a random access preamble needs selecting. That is to say, while the examples and embodiments of the present application may provide particular benefits when applied to conditional handover, similar benefits may be achieved when applied to other situations. For example, the teachings of FIG. 7 may be modified for legacy handover, where a handover command is sent to the UE from the source cell and causes the UE to immediately perform the handover operation.

In some examples, there is provided an apparatus comprising means for receiving, at a user equipment from a first access point supporting a serving cell, one or more user equipment specific allocations of a random access preamble and timing information associated with the random access preamble, the timing information indicating when the user equipment is to use the associated random access preamble; responsive to the receiving, starting a timer; and sending, to a second access point supporting a target cell, a random access request including one of the one or more random access preambles, the included random access preamble being selected based on a value of the timer and the timing information.

In some examples, the apparatus may comprise at least one processor and at least one memory including a computer program code, the at least one memory and computer program code configured to, with the at least one processor, cause the apparatus at least to: receive, at a user equipment from a first access point supporting a serving cell, one or more user equipment specific allocations of a random access preamble and timing information associated with the random access preamble, the timing information indicating when the user equipment is to use the associated random access preamble; responsive to the receiving, start a timer; and send, to a second access point supporting a target cell, a random access request including one of the one or more random access preambles, the included random access preamble being selected based on a value of the timer and the timing information.

In some examples, there is provided an apparatus comprising means for: receiving, at a first access point supporting a serving cell from a second access point supporting a target cell, one or more user equipment specific allocations of a random access preamble and timing information associated with the random access preamble, the timing information indicating when the associated random access preamble is to be used; and sending, from the first access point to the user equipment, the one or more user equipment specific allocations of a random access preamble and timing information associated with the random access preamble.

In some examples, the apparatus may comprise at least one processor and at least one memory including a computer program code, the at least one memory and computer program code configured to, with the at least one processor, cause the apparatus at least to: receive, at a first access point supporting a serving cell from a second access point supporting a target cell, one or more user equipment specific allocations of a random access preamble and timing information associated with the random access preamble, the timing information indicating when the associated random access preamble is to be used; and send, from the first access point to the user equipment, the one or more user equipment specific allocations of a random access preamble and timing information associated with the random access preamble.

In some examples, there is provided an apparatus comprising means for: obtaining, at a second access point supporting a target cell from a radio access node data collection entity, one or more user equipment specific allocations of a random access preamble and timing information associated with the random access preamble, the timing information indicating when the associated random access preamble is to be used; sending, from the second access point to a first access point supporting a serving cell, the one or more user equipment specific allocations of the random access preamble and timing information associated with the random access preamble; and receiving, at the second access point from the user equipment, a random access request including a random access preamble corresponding to one of the user equipment specific allocations of the random access preamble.

In some examples, the apparatus may comprise at least one processor and at least one memory including a computer program code, the at least one memory and computer program code configured to, with the at least one processor, cause the apparatus at least to: obtain, at a second access point supporting a target cell from a radio access node data collection entity, one or more user equipment specific allocations of a random access preamble and timing information associated with the random access preamble, the timing information indicating when the associated random access preamble is to be used; send, from the second access point to a first access point supporting a serving cell, the one or more user equipment specific allocations of the random access preamble and timing information associated with the random access preamble; and receive, at the second access point from the user equipment, a random access request including a random access preamble corresponding to one of the user equipment specific allocations of the random access preamble.

In some examples, there is provided an apparatus comprising means for: determining, at a radio access node data collection entity, one or more user equipment specific allocations of a random access preamble and timing information associated with the random access preamble, the timing information indicating when the associated random access preamble is to be used; and sending, from the radio access node data collection entity to a second access point supporting a target cell, the one or more user equipment specific allocations of a random access preamble and timing information associated with the random access preamble.

In some examples, the apparatus may comprise at least one processor and at least one memory including a computer program code, the at least one memory and computer program code configured to, with the at least one processor, cause the apparatus at least to: determine, at a radio access node data collection entity, one or more user equipment specific allocations of a random access preamble and timing information associated with the random access preamble, the timing information indicating when the associated random access preamble is to be used; and send, from the radio access node data collection entity to a second access point supporting a target cell, the one or more user equipment specific allocations of a random access preamble and timing information associated with the random access preamble.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

It is noted that whilst some embodiments have been described in relation to 5G networks, similar principles can be applied in relation to other networks and communication systems. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

In general, the various embodiments may be implemented in hardware or special purpose circuitry, software, logic or any combination thereof. Some aspects of the disclosure may be implemented in hardware, while other aspects may be implemented in firmware or software which may be executed by a controller, microprocessor or other computing device, although the disclosure is not limited thereto. While various aspects of the disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit (s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The embodiments of this disclosure may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the disclosure may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The scope of protection sought for various embodiments of the disclosure is set out by the independent claims. The embodiments and features, if any, described in this specification that do not fall under the scope of the independent claims are to be interpreted as examples useful for understanding various embodiments of the disclosure.

The foregoing description has provided by way of non-limiting examples a full and informative description of the exemplary embodiment of this disclosure. However, various modifications and adaptations may become apparent to those skilled in the relevant arts in view of the foregoing description, when read in conjunction with the accompanying drawings and the appended claims. However, all such and similar modifications of the teachings of this disclosure will still fall within the scope of this invention as defined in the appended claims. Indeed, there is a further embodiment comprising a combination of one or more embodiments with any of the other embodiments previously discussed.

The invention claimed is:

1. An apparatus comprising at least one processor and at least one memory including a computer program code, the at least one memory and computer program code configured to, with the at least one processor, cause the apparatus at least to:

receive, at a user equipment from a first access point supporting a serving cell, one or more user equipment specific allocations of a random access preamble and timing information associated with the random access preamble, the timing information indicating one or more specific timing instants at which the user equipment is to use the associated random access preamble;

responsive to the receiving, start a timer; and send, to a second access point supporting a target cell, a random access request including one of the one or more random access preambles, the included random access preamble being selected based on comparison of a value of the timer and the one or more specific timing instants indicated by the timing information to determine which of the one or more random access preambles to use.

2. The apparatus of claim 1, wherein the apparatus is further caused to send, to the first access point supporting the serving cell, a measurement report or receive, from the first access point, at least one of:

a handover command to cause the user equipment to initiate handover from the serving cell to the target cell; or information identifying one or more conditions, wherein the user equipment is configured to perform handover from the serving cell to the target cell when the one or more conditions are met.

3. The apparatus of claim 1, wherein the apparatus is further caused to determine that one or more conditions have been met, and wherein the random access request is sent responsive to the determination.

4. The apparatus of claim 1, wherein the apparatus is further caused to log a value of the timer when sending the random access request including the one of the one or more random access preambles.

5. The apparatus of claim 1, wherein the apparatus is further caused to:

determine that a value of the timer reaches a certain value;

determine that no random access response has been received from the target cell before the value of the timer has reached the certain value; and perform a contention based random access procedure to access the target cell responsive to determining that no random access response has been received from the target cell before the value of the timer has reached the certain value.

6. An apparatus comprising:

at least one processor and at least one memory including a computer program code, the at least one memory and computer program code configured to, with the at least one processor, cause the apparatus at least to:

receive, at a first access point supporting a serving cell from a second access point supporting a target cell, one or more user equipment specific allocations of a random access preamble and timing information associated with the random access preamble, the timing information indicating one or more specific timing instants at which the associated random access preamble is to be used; and send, from the first access point to the user equipment, the one or more user equipment specific allocations of a random access preamble and timing information associated with the random access preamble, the user equipment to send, to a second access point supporting a target cell, a random access request including one of the one or more random access preambles, the included random access preamble being selected based on comparison of a value of the timer and the one or more specific timing instants indicated by the timing information to determine which of the one or more random access preambles to use.

7. The apparatus of claim 6, wherein the apparatus is further caused to:

receive, from the user equipment, a measurement report;

determine that a handover of the user equipment is necessary based on the measurement report; and send, to the second access point, a handover preparation request for the user equipment to the target cell, wherein the target cell is selected based on the measurement report.

8. The apparatus of claim 7, wherein the apparatus is further caused to receive, from the second access point, a handover acknowledgement, wherein the handover acknowledgement includes the one or more user equipment specific allocations of a random access preamble and timing information associated with the random access preamble, wherein sending to the user equipment one or more user equipment specific allocations of a random access preamble and timing information associated with the random access preamble comprises sending a radio resource control reconfiguration message including the one or more user equipment specific allocations of a random access preamble and timing information associated with the random access preamble.

9. The apparatus of claim 8, wherein the sending comprises at least one of:

sending a handover command to cause the user equipment to initiate handover from the serving cell to the target cell, wherein the handover command includes the one or more user equipment specific allocations of a random access preamble and timing information associated with the random access preamble; or sending the one or more user equipment specific allocations of a random access preamble and timing information associated with the random access preamble, and information identifying one or more conditions, wherein the user equipment is configured to perform handover from the serving cell to the target cell when the one or more conditions are met.

10. The apparatus of claim 6, wherein the apparatus is further caused to send the one or more user equipment specific allocations of a random access preamble and timing information associated with the random access preamble to a plurality of user equipments, wherein the timing information provided to each of the plurality of user equipments is one of: non-overlapping or overlapping.

11. An apparatus comprising at least one processor and at least one memory including a computer program code, the at least one memory and computer program code configured to, with the at least one processor, cause the apparatus at least to:

obtain, at a second access point supporting a target cell from a radio access node data collection entity, one or more user equipment specific allocations of a random access preamble and timing information associated with the random access preamble, the timing information indicating when the associated random access preamble is to be used;

send, from the second access point to a first access point supporting a serving cell, the one or more user equipment specific allocations of the random access preamble and timing information associated with the random access preamble;

receive, at the second access point from the user equipment, a random access request including a random access preamble corresponding to one of the user equipment specific allocations of the random access preamble; and responsive to receiving the random access request, send, to the radio access node data collection entity, information identifying the random access preamble included in the random access request and timing information identifying when the random access request was received by the second access point.

12. The apparatus of claim 11, wherein the apparatus is further caused to receive, at the second access point from the first access point, a handover preparation request for the user equipment, wherein the obtaining is performed response to receiving the handover preparation request.

13. The apparatus of claim 11, wherein the obtaining comprises:

sending, to the radio access node data collection entity, a request for the one or more user equipment specific allocations of a random access preamble and timing information associated with the random access preamble; and receiving, from the radio access node data collection entity, the one or more user equipment specific allocations of a random access preamble and timing information associated with the random access preamble.

14. The apparatus of claim 13, wherein the request comprises at least one of:

an identifier of the serving cell of the user equipment;

information associated with any active user equipment beams;

user equipment capability information;

user equipment mobility state information;

an estimated arrival probability of the user equipment at the target cell;

a list of candidate beams for the user equipment at the target cell; or a current load status of beams and random access channel at the target cell.

15. The apparatus of claim 11, wherein the obtaining comprises:

receiving, from the radio access node data collection entity, a list comprising a plurality of user equipment specific allocations of a random access preamble and timing information associated with the random access preamble; and selecting, by the second access point, one of the plurality of user equipment specific allocations of a random access preamble and timing information associated with the random access preamble.

16. The apparatus of claim 15, wherein the apparatus is further caused to send, to the radio access node data collection entity, information identifying the selected one of the user equipment specific allocations of a random access preamble and timing information associated with the random access preamble.

17. The apparatus of claim 11, wherein the apparatus is further caused to responsive to receiving the random access request, send, to the first access point, a handover acknowledgement, wherein the handover acknowledgement includes the random access preamble included in the random access request.

* * * * *